(12) United States Patent
Babichenko

(10) Patent No.: US 12,459,340 B1
(45) Date of Patent: Nov. 4, 2025

(54) TAILGATE BIKE PAD SYSTEM

(71) Applicant: Natalia Babichenko, Garden City, ID (US)

(72) Inventor: Natalia Babichenko, Garden City, ID (US)

( * ) Notice: Subject to any disclaimer, the term of this patent is extended or adjusted under 35 U.S.C. 154(b) by 0 days.

(21) Appl. No.: 19/185,359

(22) Filed: Apr. 22, 2025

(51) Int. Cl.
*B60J 11/06* (2006.01)
*B60R 9/06* (2006.01)
*B60R 9/10* (2006.01)

(52) U.S. Cl.
CPC ............... *B60J 11/06* (2013.01); *B60R 9/06* (2013.01); *B60R 9/10* (2013.01)

(58) Field of Classification Search
CPC ........................................................ B60J 11/06
See application file for complete search history.

(56) References Cited

U.S. PATENT DOCUMENTS

| | | | | |
|---|---|---|---|---|
| 6,286,885 | B1 * | 9/2001 | Ramos ................ | B60R 13/01 296/64 |
| 6,695,556 | B2 * | 2/2004 | Addy ................... | B60R 9/00 410/97 |
| 9,522,767 | B1 * | 12/2016 | Pass .................... | G09F 21/04 |
| 9,701,225 | B1 * | 7/2017 | Hogan ................. | A47C 4/52 |
| 10,300,861 | B1 * | 5/2019 | Green .................. | B60R 7/02 |
| 10,696,236 | B1 * | 6/2020 | Starkey ............... | B60P 1/283 |
| 2003/0038497 | A1 * | 2/2003 | Fitzgerald ........... | B60R 5/04 296/39.1 |
| 2005/0275241 | A1 * | 12/2005 | Rothwell ............. | B60R 11/00 296/136.01 |
| 2008/0203752 | A1 * | 8/2008 | Warkentin ........... | B62D 33/0273 296/57.1 |
| 2017/0144614 | A1 * | 5/2017 | DePalma ............. | B60R 13/013 |
| 2020/0331332 | A1 * | 10/2020 | Low .................... | B60J 11/06 |
| 2022/0001808 | A1 * | 1/2022 | Low .................... | B60R 13/01 |
| 2022/0063508 | A1 * | 3/2022 | Shneyer .............. | B60R 9/10 |
| 2022/0339996 | A1 * | 10/2022 | Malina ................ | B60R 19/44 |
| 2022/0379817 | A1 * | 12/2022 | Gu ....................... | B60R 9/06 |
| 2023/0286363 | A1 * | 9/2023 | Madrid ................ | B60J 11/06 |
| 2023/0365075 | A1 * | 11/2023 | Harris .................. | B62D 33/0222 |
| 2024/0123916 | A1 * | 4/2024 | Petrula ................ | B60R 13/01 |
| 2024/0308315 | A1 * | 9/2024 | Schreiber ............ | B60J 11/06 |
| 2025/0091419 | A1 * | 3/2025 | Kramer ............... | B60R 9/06 |

* cited by examiner

*Primary Examiner* — Brian D Nash
(74) *Attorney, Agent, or Firm* — Law Office of Ilya Libenzon

(57) ABSTRACT

A tailgate bike pad system is disclosed, comprising a pad assembly configured to be placed over a truck tailgate, with an opening for latch access. A securing mechanism, disposed at the bending line of the pad assembly, transitions between an open and tightened state to secure the pad without requiring straps underneath the tailgate. The securing mechanism may include clips, clamps, or other retention means, embedded within or attached to the pad. The system enables quick installation, secure attachment, and easy removal while preventing bike damage.

17 Claims, 31 Drawing Sheets

120

TAILGATE BIKE PAD SYSTEM

TECHNICAL FIELD

Embodiments disclosed herein relate generally to a tailgate bike pad system for mounting a protective pad over a pickup truck tailgate. M ore specifically, the disclosed embodiments utilize a metal clip system, either embedded within or externally attached to the pad, to facilitate easy installation and removal without the need for threading straps under the tailgate. The system employs a spaced-apart dual-pad configuration that allows the pad to be placed over the tailgate while being held securely in place by the clip mechanism. This design improves safety, convenience, and durability compared to conventional strap-based systems, eliminating risks associated with pinching injuries, misalignment, and frequent readjustment.

BACKGROUND ART

Currently available tailgate bike pads primarily rely on straps for installation, which presents several significant drawbacks. The installation process requires users to feed the straps under the tailgate, making it difficult and cumbersome to align and tighten them properly. This method is not only time-consuming but also exposes users to safety hazards, such as pinching and crushing injuries, particularly if the tailgate inadvertently closes or shifts during the process. Straps can also become misaligned or tangled, increasing the likelihood of improper securing, which may lead to bike instability or damage. Additionally, these systems require frequent readjustment as straps can loosen over time, and they obstruct access to the truck bed, making it inconvenient to open and close the tailgate without undoing the securing system. Furthermore, over-tightening the straps can create uneven pressure on the tailgate, leading to premature wear and tear on both the pad and the vehicle.

The Tailgate Bike Pad System of the present disclosure eliminates the need for straps by incorporating a secure and releasable metal clip system. The clip is either embedded into the interior of the pad or attached to its exterior, allowing for a firm yet easily removable connection. Installation involves spacing apart two pads and placing them over the tailgate, with the clips securing them in place without requiring under-tailgate threading. This design makes installation and removal significantly easier and safer. Unlike strap-based systems, the clip mechanism prevents pinching injuries and ensures a firm and stable attachment that does not shift during transportation. The system also maintains full tailgate access without obstruction, allowing for easy operation of the truck bed without interference from securing mechanisms.

Commercially available systems are often expensive, difficult to install, and hard to uninstall, further highlighting the need for an improved solution. The Tailgate Bike Pad System of the present disclosure addresses these issues by providing a cost-effective, user-friendly, and durable alternative that enhances safety and efficiency. By utilizing an embedded or externally attached clip system and a pad-spacing installation method, this innovation offers a seamless and reliable way to secure a tailgate pad without the complications of traditional strap-based methods.

SUMMARY OF THE EMBODIMENTS

The present disclosure relates to a tailgate bike pad system configured for securing onto a tailgate of a truck bed. The system comprises a pad assembly that includes a first section covering the exterior-facing portion of the tailgate and a second section covering the interior-facing portion, with a bending line positioned between the two sections. An opening is formed in the pad assembly, allowing access to the tailgate latch when installed. A securing mechanism is disposed at the bending line and is operable between an open state and a tightened state, where the open state enables the first and second sections to be spaced apart for placement, and the tightened state contracts or engages to secure the pad in place without requiring straps under the tailgate.

In some embodiments, the securing mechanism comprises at least one clip, which remains open when the pad sections are spaced apart and closes when the pad assembly is positioned over the tailgate. In certain configurations, two clips are positioned on opposite sides of the opening for the tailgate latch, ensuring a secure fit while maintaining access to the latch. The securing mechanism may be embedded within the pad assembly's interior or attached to its exterior surface. In some implementations, the securing mechanism includes at least one clip with an opening aligned with the pad assembly's opening, thereby securing the pad while still allowing access to the tailgate latch. Additionally, in certain embodiments, a rubber padding is incorporated onto the clip to prevent direct contact with the bicycle, reducing the risk of scratching or damage.

In another embodiment, the securing mechanism comprises a clamp assembly featuring a rotating knob, a fixed jaw engaging one side of the tailgate, and a movable jaw positioned opposite the fixed jaw, with a threaded adjustment mechanism connected to the rotating knob. Rotating the knob causes the movable jaw to tighten against or loosen from the tailgate, securing or releasing the pad assembly. In some embodiments, the clamp assembly is attached to the exterior surface of the pad and further includes rubber padding to prevent bicycle contact and potential damage. Alternatively, the clamp assembly may be embedded within the pad assembly, with the rotating knob exposed through an opening in the pad, enabling user access for adjustments while maintaining an integrated design.

Additional securing mechanisms may include a spring-loaded latch, which automatically engages the tailgate upon placement and releases upon manual actuation. In another embodiment, a magnetic retention system is provided, incorporating one or more magnets embedded within the pad assembly that attach to a corresponding ferromagnetic surface on the tailgate. Other variations of the securing mechanism include an elastic tension band positioned along the bending line, which stretches during installation and contracts to hold the pad securely in place.

A method of securing the tailgate bike pad system is also disclosed. The method includes positioning the pad assembly over the tailgate, engaging the securing mechanism in an open state while placing the pad assembly to allow the sections to be spaced apart, and activating the securing mechanism to transition to a tightened state, securing the pad onto the tailgate without requiring straps extending underneath. The method further includes ensuring the opening in the pad remains accessible for tailgate latch operation and loading one or more bicycles onto the pad assembly for transportation. In some embodiments, closing one or more clips enables the securing mechanism to grip the tailgate, or alternatively, a clamp assembly with a rotating knob may be used to adjust a clamping force for securing the pad. Additionally, the method may further include removing the pad assembly by transitioning the securing mechanism back to the open state and lifting it off the tailgate.

These embodiments provide a secure, strap-free attachment system that facilitates easy installation and removal, enhances user safety, and improves bike transport efficiency while preventing potential damage to both the bike and the vehicle.

Other aspects, embodiments and features of the device and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. N or is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood, however, that neither the device nor the method is limited to the precise arrangements and instrumentalities shown.

DETAILED DESCRIPTION OF SPECIFIC EMBODIMENTS

The present disclosure provides a tailgate bike pad system configured for securing onto a tailgate of a truck bed.

Figure 1:
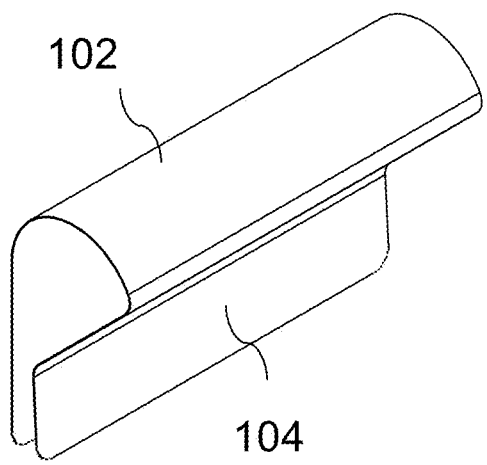
FIG. 1 is a perspective view of a clip, illustrating its structural features, including a curved upper portion and a hook-like section designed for securing the bike pad to the tailgate.
Figure 2:
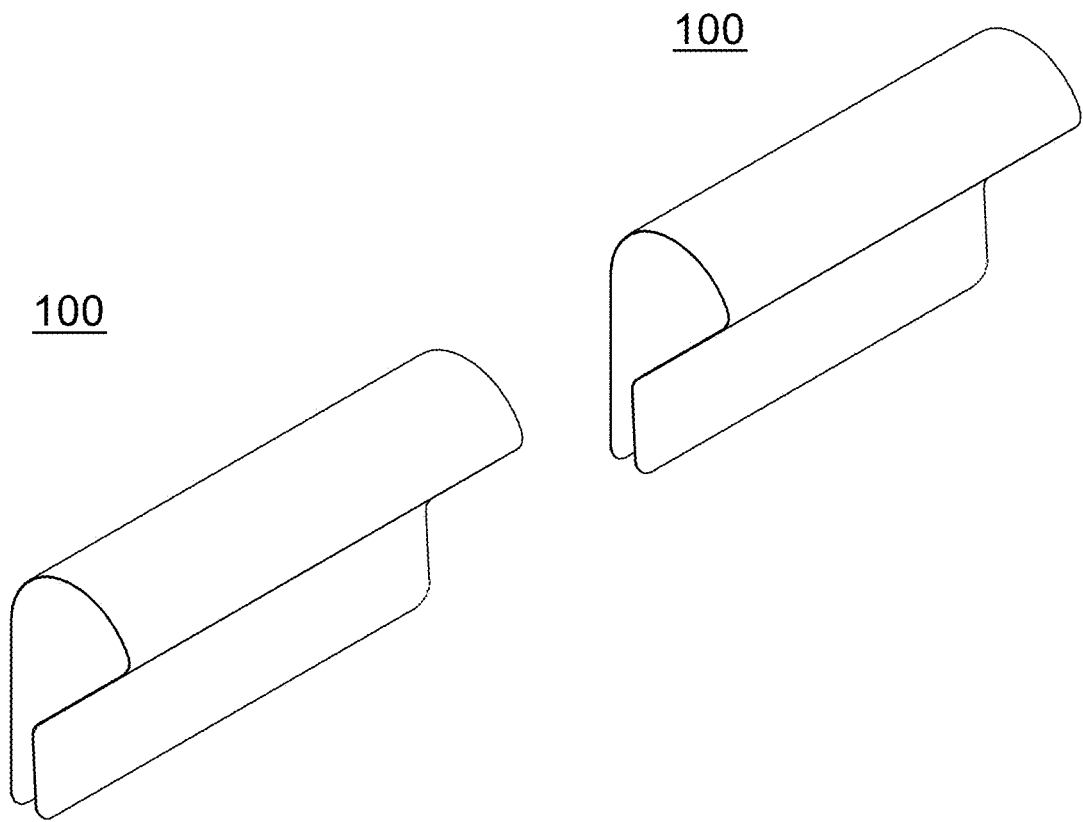
FIG. 2 is a perspective view of two clips, showing their relative positioning and how they may be arranged for attachment to the bike pad.
Figure 3:
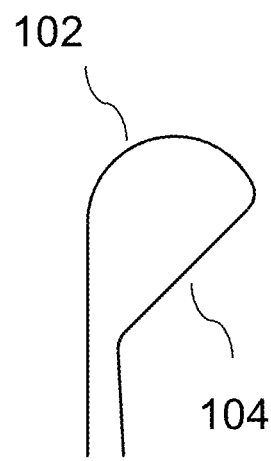
FIG. 3 is a side view (profile) of a clip, providing a detailed representation of its cross-sectional shape and the configuration of its engagement features.

Referring to FIG. 1, a securing clip 100 is shown in perspective view, illustrating its structural design, including a curved upper portion 102 and a hook-like engagement section 104, which facilitates attachment to a tailgate 200. FIG. 2 depicts two clips 100, showing their relative positioning for attachment to a pad assembly 300. FIG. 3 provides a side (profile) view of the clip 100, further detailing its engagement geometry with the tailgate 200.

Figure 4:
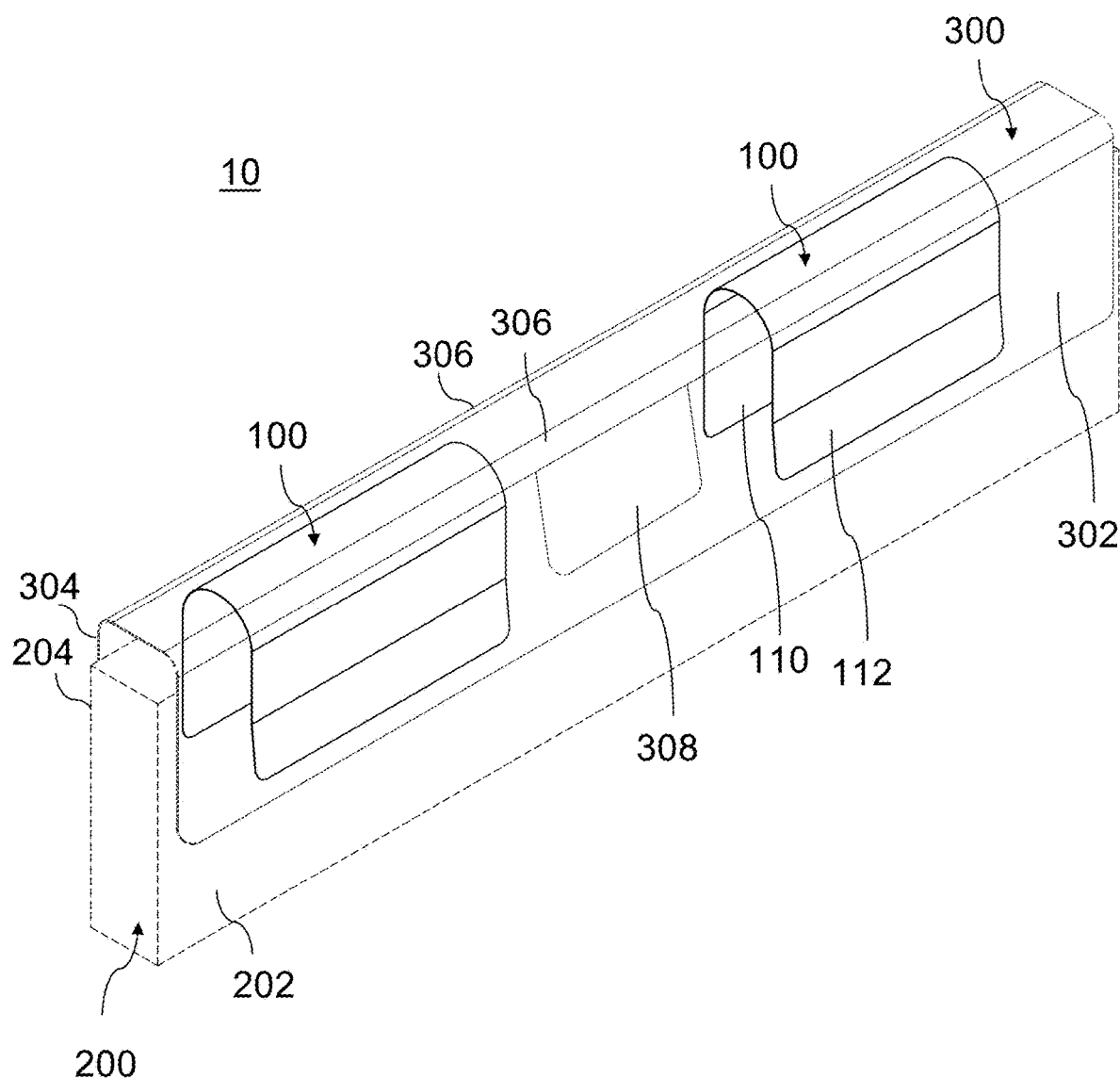
FIG. 4 is a perspective view of two clips embedded within a bike pad and secured onto a tailgate, illustrating an embodiment where the clips are integrated into the structure of the pad assembly for securing the pad in place.

As shown in FIG. 4, an embodiment of the tailgate bike pad system 10 includes the pad assembly 300, which comprises a first section 302 configured to cover the exterior-facing portion 202 of the tailgate 200 and a second section 304 positioned to cover the interior-facing portion 204 of the tailgate 200, as well as an opening 308 formed in the pad assembly 300 and positioned to provide access to a tailgate latch when the pad assembly is installed. The bending portion 306 between the first section 302 and the second section 304 enables the pad assembly to conform to the tailgate 200. Embedded within the pad assembly 300 are securing clips 100, which are disposed at the bending line 306 and function as the securing mechanism to retain the pad assembly 300 in place.

Figure 5:
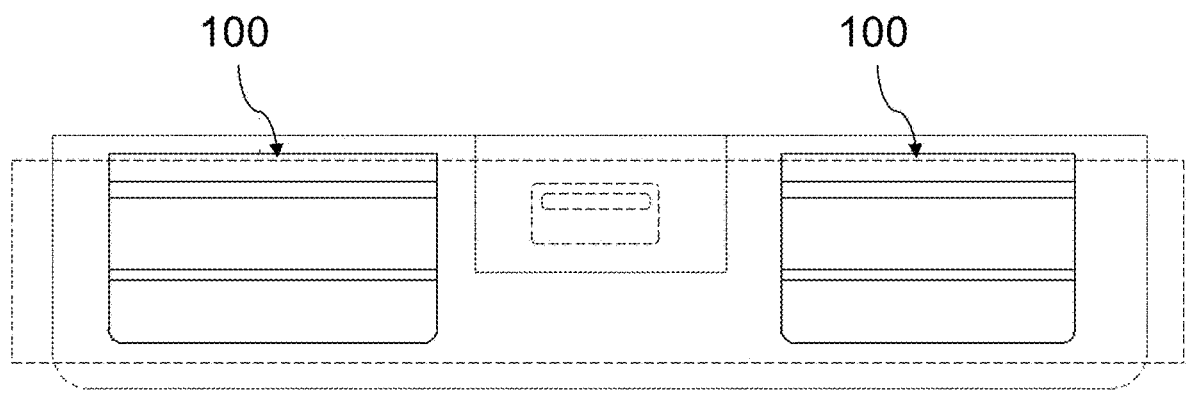
FIG. 5 is a front view of the embodiment shown in FIG. 4, depicting the positioning of the embedded clips relative to the bike pad and tailgate when installed.
Figure 6:
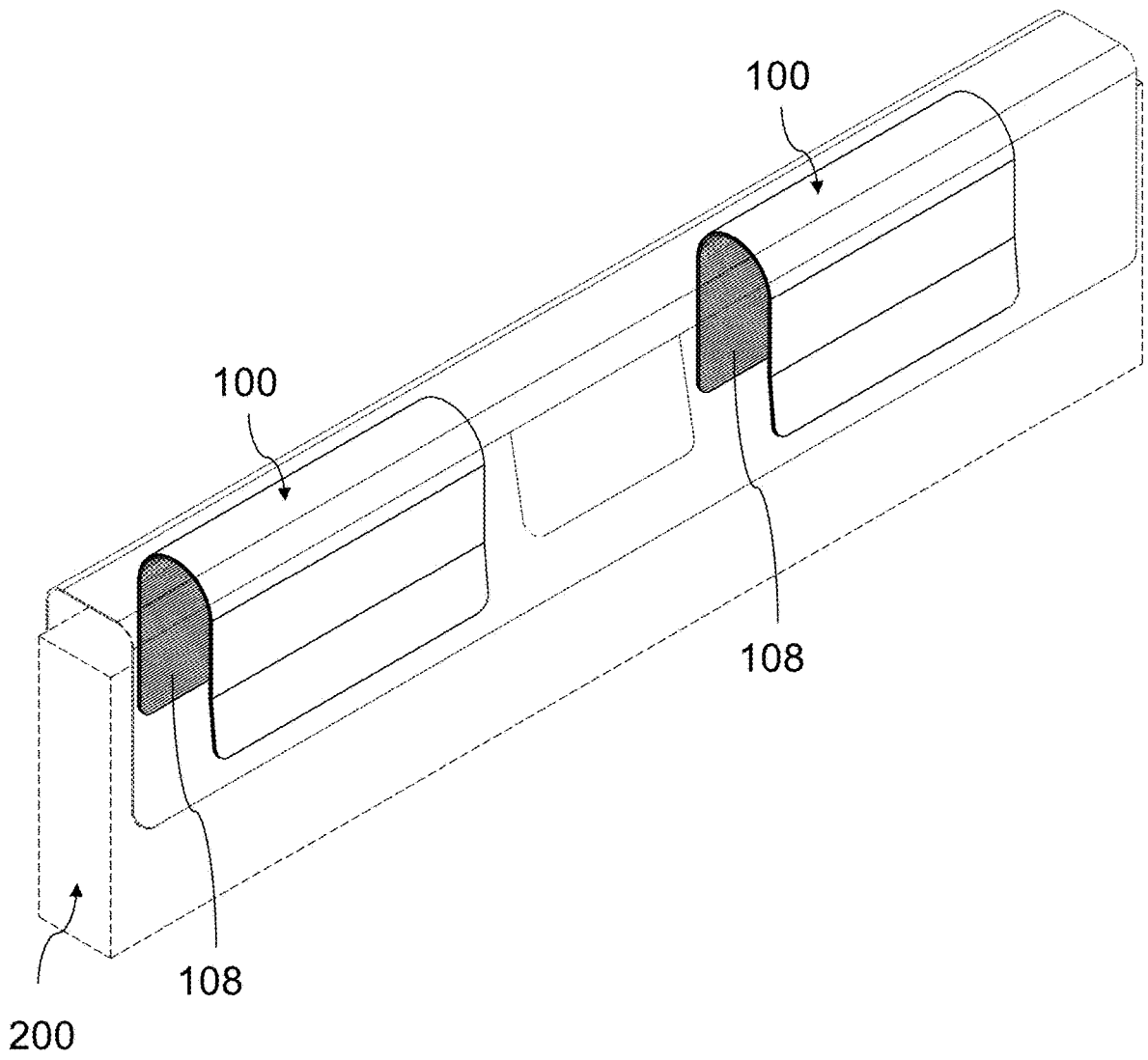
FIG. 6 is another embodiment of the present disclosure, in which the clips are embedded within the bike pad and further include rubber padding on their interior surfaces to prevent scratching or damage to the tailgate during use.
Figure 7:
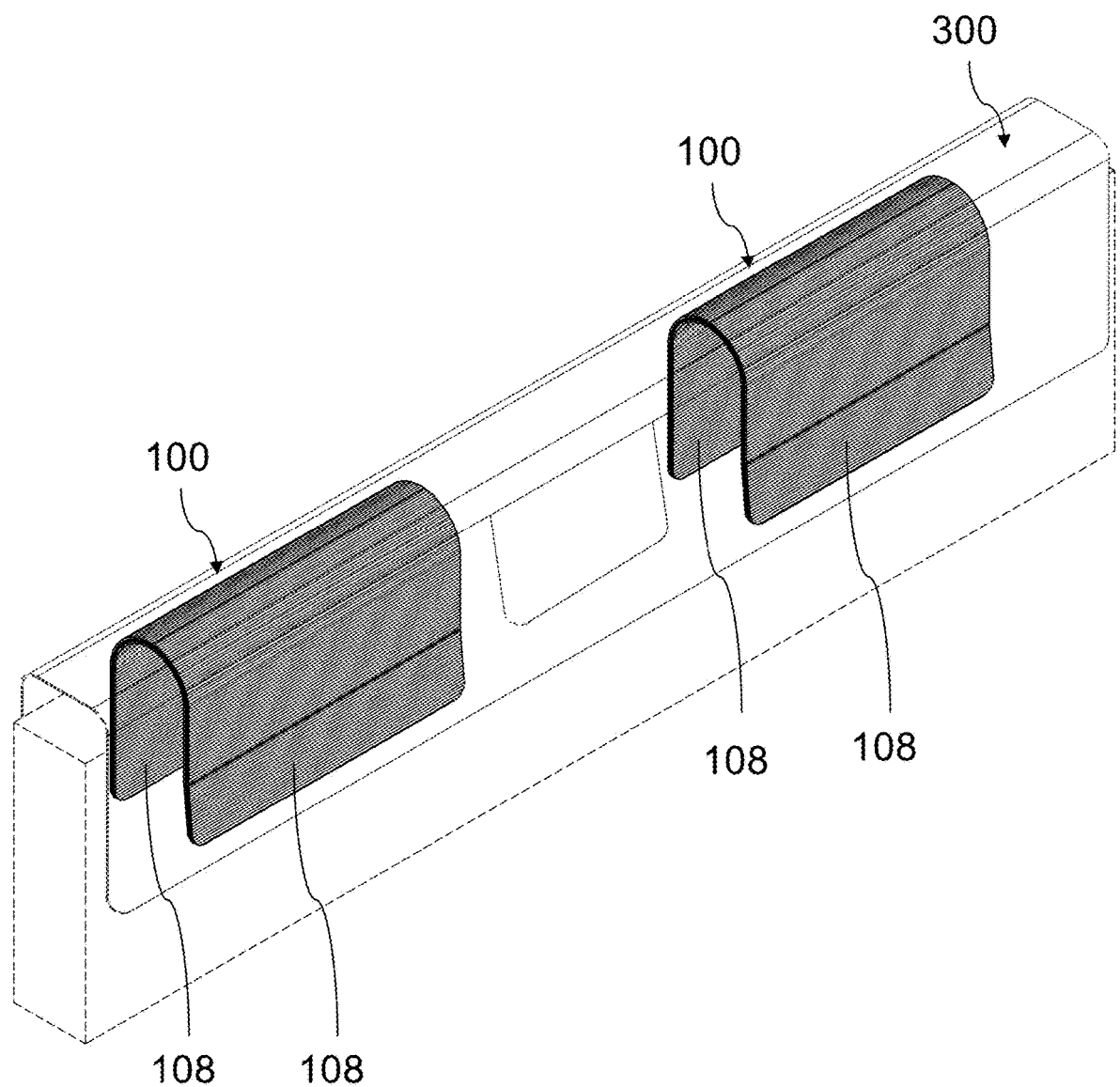
FIG. 7 is another embodiment of the present disclosure, wherein the clips are attached to the exterior of the bike pad rather than being embedded, and rubber padding is provided on both the interior and exterior surfaces of the clips to protect both the tailgate and the bicycles secured on the pad.

FIG. 5 provides a front view of the embodiment of FIG. 4, showing the securing clips 100 within the pad assembly 300. In another embodiment, illustrated in FIG. 6, the securing clips 100 include rubber padding 108 on their interior surfaces, preventing direct metal contact with the tailgate 200, thereby reducing the risk of scratching or damage. In FIG. 7, an alternative configuration is shown where the clips 100 are instead attached externally to the pad assembly 300, with rubber padding 108 disposed on both the interior 110 and exterior 112 surfaces of each clip 100, ensuring protection for both the tailgate 200 and any bicycles secured against the pad assembly 300.

Figure 8:
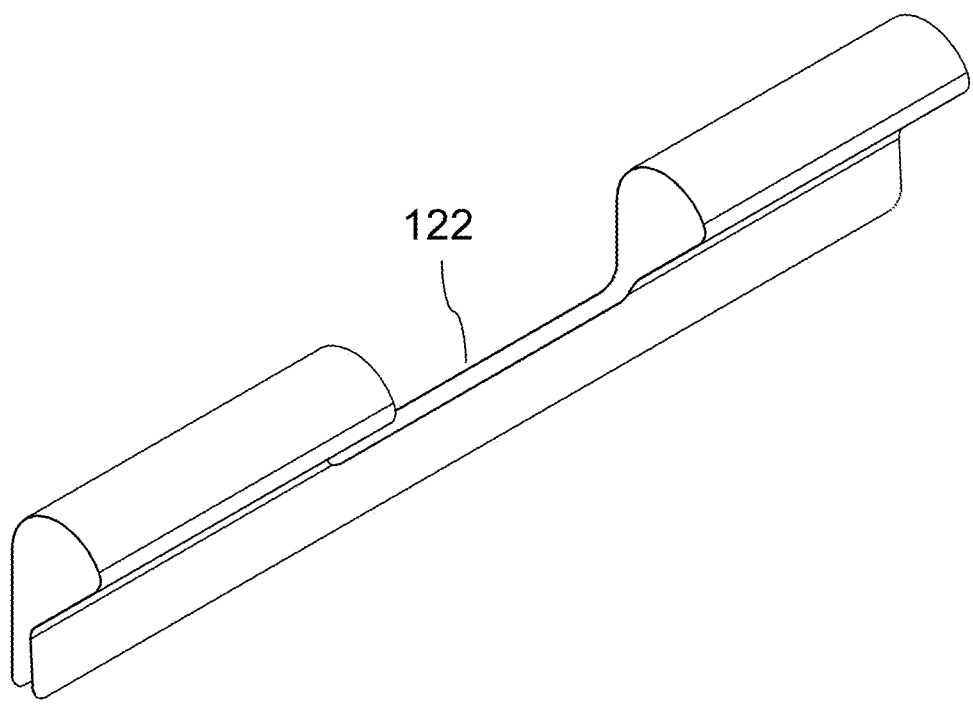
FIG. 8 is a perspective view of an implementation of the securing mechanism in which the clip is formed as a single, integral piece with a cut-out portion aligned with the pad assembly's opening. The securing mechanism extends across the bending line of the pad assembly and features a continuous structure with recessed or cut-out sections designed to provide unobstructed access to the tailgate latch. This integral design eliminates the need for separate components while maintaining a rigid and secure attachment, allowing the pad to be firmly positioned over the tailgate while permitting latch operation.
Figure 9:
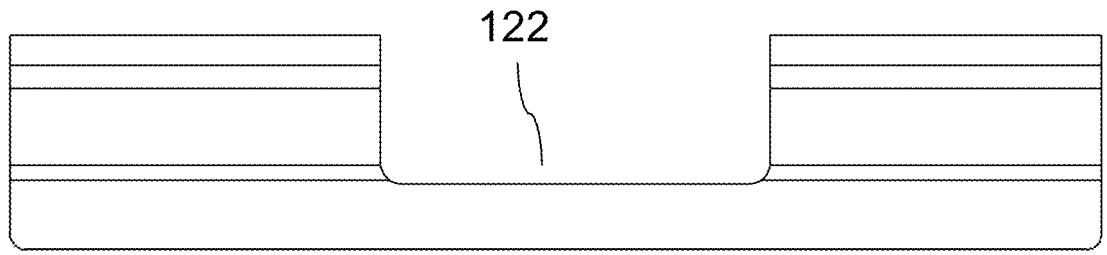
FIG. 9 is a front view of the securing mechanism, illustrating the integral clip with a cut-out portion aligned with the pad assembly's opening.
Figure 10:
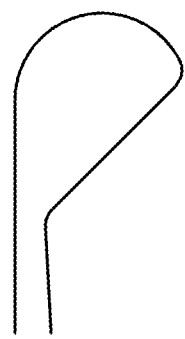
FIG. 10 is a side (profile) view of the securing mechanism, showing the cross-sectional shape of the integral clip and how it interacts with the tailgate.

Referring to FIG. 8, another embodiment of the securing mechanism is shown, wherein the clip 120 is an integral, single-piece structure featuring a cut-out portion 122 aligned with an opening 308 in the pad assembly 300 as shown in FIG. 4. This design ensures that the tailgate latch remains accessible while maintaining a secure attachment. FIG. 9 illustrates a front view of this embodiment, while FIG. 10 provides a side (profile) view, detailing the interaction between the clip 120 and the tailgate 200.

Figure 11:
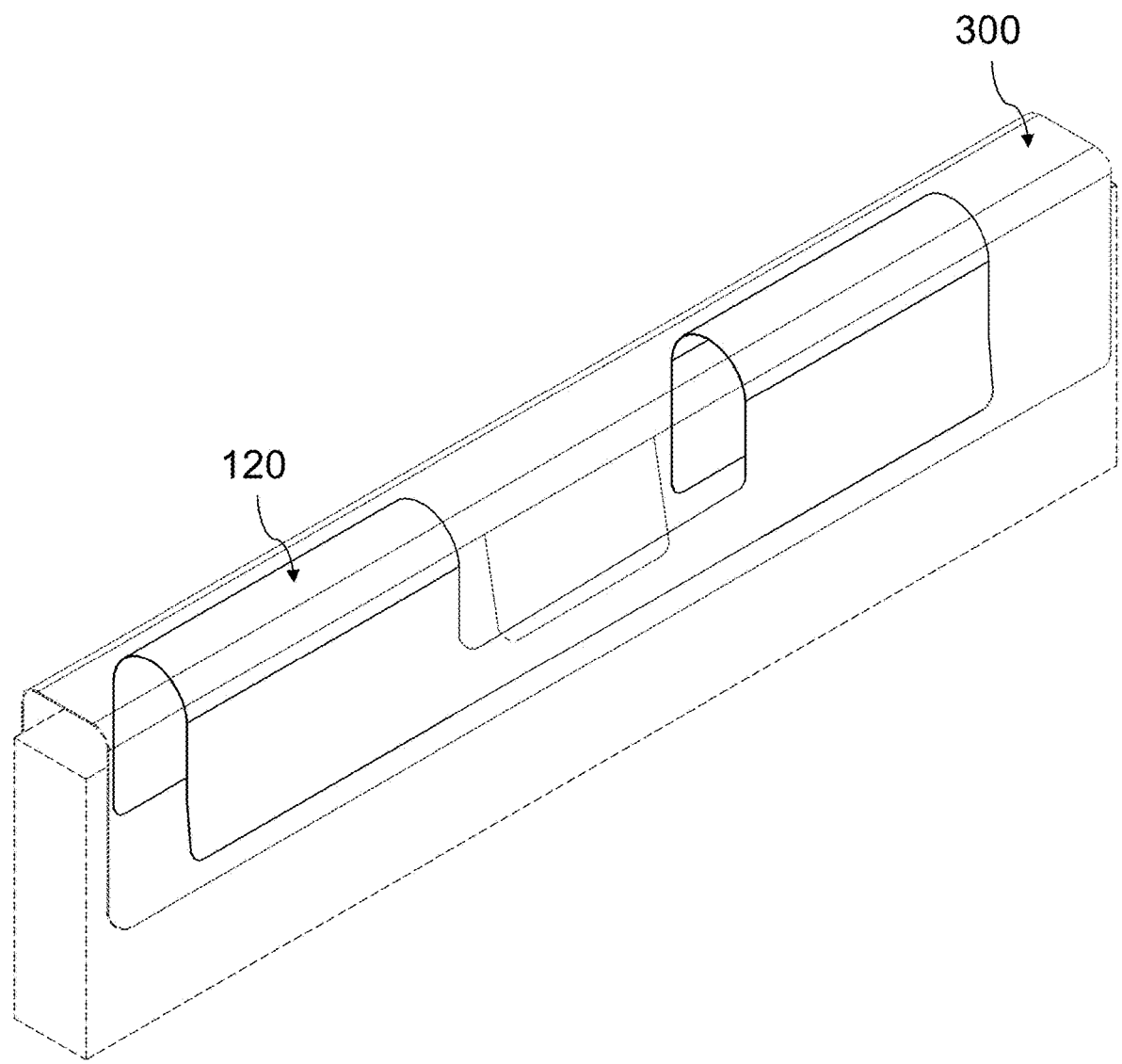
FIG. 11 is a perspective view of the securing mechanism in which the integral clip is embedded within the pad assembly and attached to the tailgate, demonstrating how the clip engages with the tailgate while maintaining access to the latch.
Figure 12:
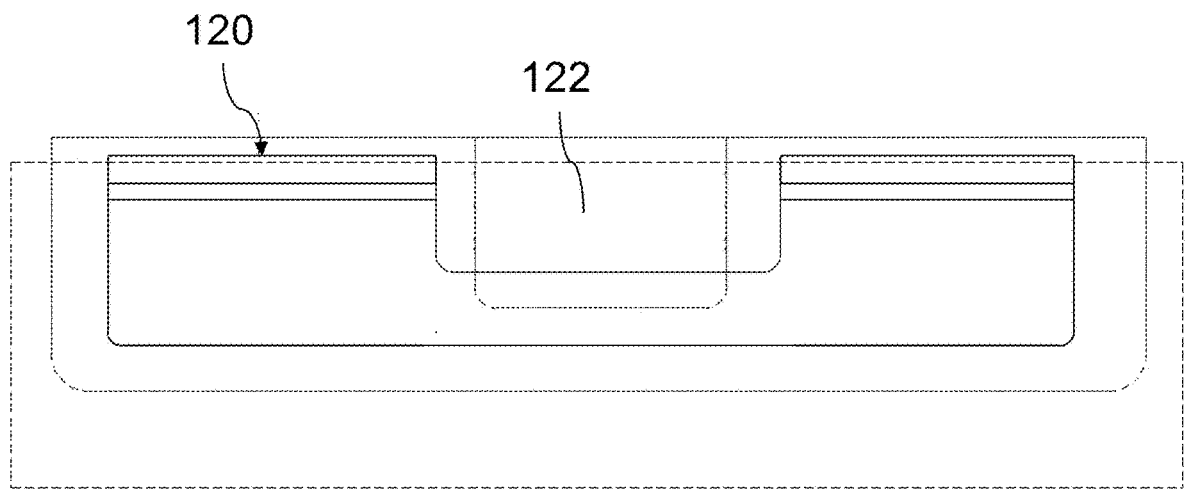
FIG. 12 is a front view of the embodiment shown in FIG. 11, providing a detailed illustration of how the integral clip is positioned within the pad assembly while securing the pad to the tailgate.
Figure 13:
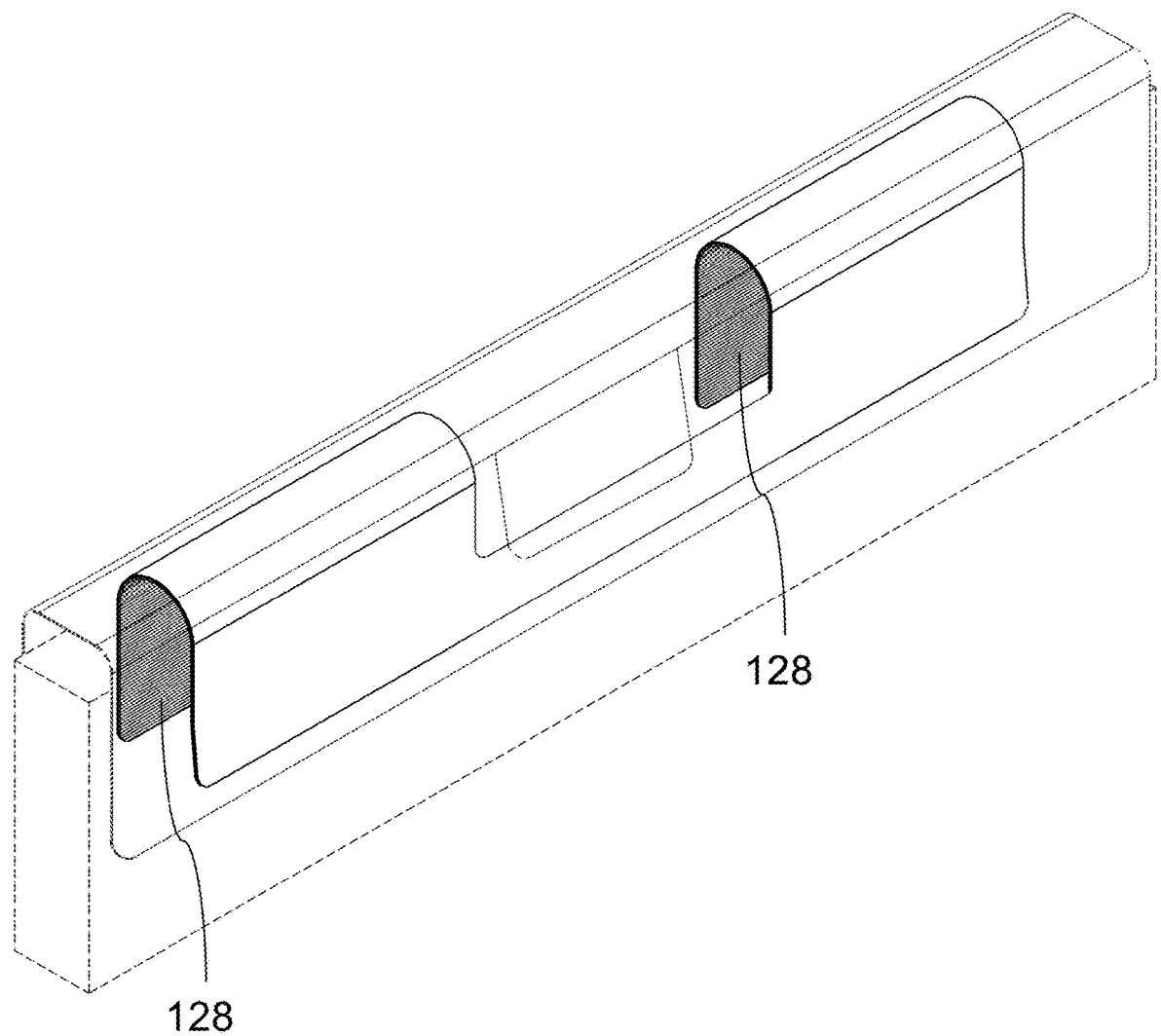
FIG. 13 is another embodiment of the present disclosure, wherein rubber padding is disposed on the interior surface of the integral clip to prevent direct contact between the metal clip and the tailgate, thereby reducing the risk of scratching or damage.
Figure 14:
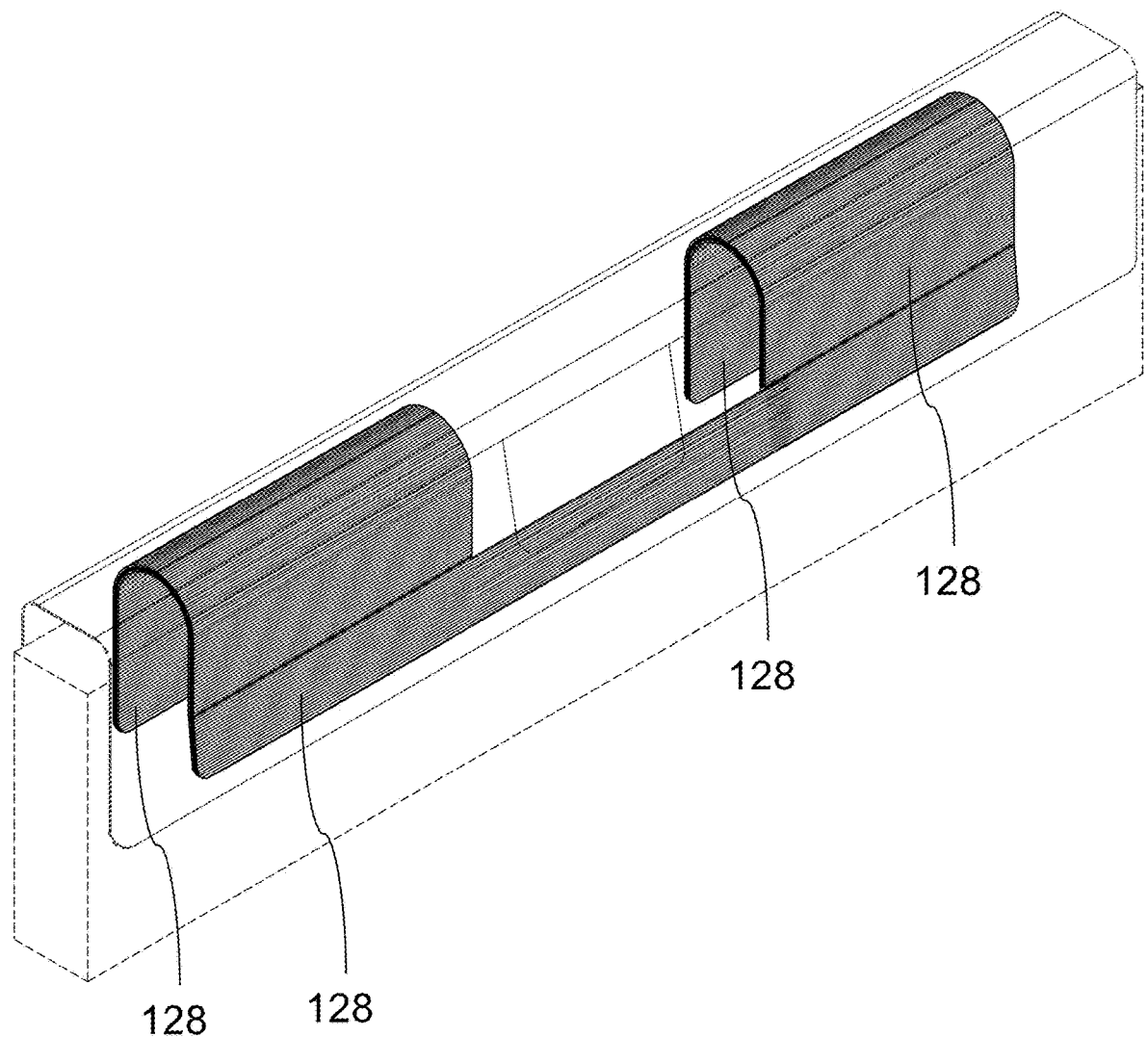
FIG. 14 is another embodiment of the present disclosure, in which the integral clip is attached to the exterior of the pad assembly, and rubber padding is provided on both the interior and exterior surfaces of the clip, offering additional protection to both the tailgate and any bicycles resting against the pad.

In FIG. 11, an embodiment is depicted in which the clip 120 is embedded within the pad assembly 300 while remaining engaged with the tailgate 200. FIG. 12 presents a front view of this embodiment, highlighting how the clip 120 is positioned relative to the pad assembly 300. FIG. 13 shows a modification wherein rubber padding 128 is applied to the interior surface of the clip 120, further minimizing direct contact with the tailgate 200. FIG. 14 presents another embodiment where the clip 120 is attached externally to the pad assembly 300, with rubber padding 128 provided on both interior 130 and exterior 132 surfaces of the clip 120, offering enhanced protection for both the tailgate 200 and any bicycles 500 positioned against the pad assembly 300.

Figure 15:
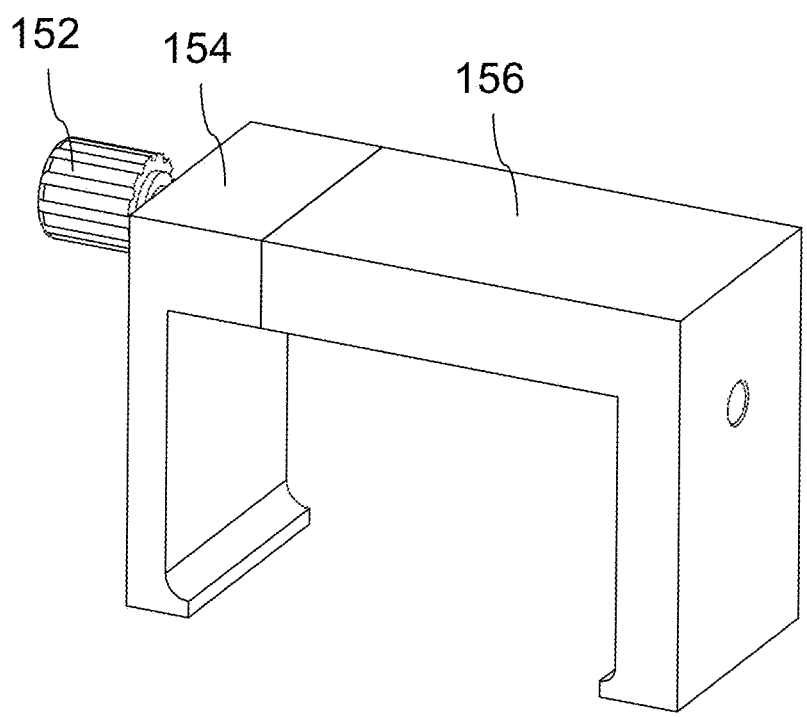
FIG. 15 is a perspective view of a clamp assembly, illustrating an alternative embodiment of the securing mechanism. The clamp assembly includes a rotating knob, a fixed jaw that engages one side of the tailgate, and a movable jaw positioned opposite the fixed jaw. The movable jaw is adjustable via a threaded adjustment mechanism connected to the rotating knob, allowing the user to tighten or loosen the clamp for securing or releasing the bike pad from the tailgate. This configuration provides a tool-free, adjustable securing mechanism that ensures a firm attachment while allowing for easy removal when necessary.

Turning to FIG. 15, an alternative securing mechanism is illustrated, where the securing mechanism comprises a clamp assembly 150. The clamp assembly 150 includes a rotating knob 152, a fixed jaw 154 engaging one side of the tailgate 200, and a movable jaw 156 positioned opposite the fixed jaw 154. A threaded adjustment mechanism connects the movable jaw 156 to the rotating knob 152, allowing a user to tighten or loosen the clamp assembly 150 for securing or releasing the pad assembly 300.

The threaded adjustment mechanism 158 is a key component of the clamp assembly 150, providing a precise and adjustable means of securing the pad assembly 300 or a standalone securing system 400 onto the tailgate 200. This mechanism consists of a rotating knob 152, a threaded shaft 159, a fixed jaw 154, and a movable jaw 156, which together allow for controlled tightening and loosening of the securing system.

The threaded shaft 159 is centrally positioned within the clamp assembly 150 and extends through a threaded bore in the movable jaw 156. Rotation of the rotating knob 152 causes the threaded shaft 159 to advance or retract within the bore, thereby moving the movable jaw 156 closer to or farther away from the fixed jaw 154. This mechanism enables the clamp assembly 150 to conform to tailgates of different thicknesses, ensuring a tight and customized fit regardless of vehicle make or model.

The rotating knob 152 is ergonomically designed, often featuring a textured or ribbed surface, to allow users to easily grip and turn the knob without requiring additional tools. In some embodiments, the knob 152 may incorporate a ratcheting mechanism, enabling incremental adjustments without requiring continuous rotation. This ratcheting feature allows users to make small, precise adjustments and ensures that the movable jaw 156 remains locked in place after each incremental movement, preventing unintended loosening due to vibrations during transport.

To enhance stability and durability, the threaded shaft 159 may be constructed from hardened steel, stainless steel, or anodized aluminum, providing corrosion resistance and wear resistance over prolonged use. Additionally, the threaded bore in the movable jaw 156 may include self-lubricating polymer bushings or ball-bearing interfaces, reducing friction and ensuring smooth operation of the mechanism.

In some embodiments, the threaded adjustment mechanism 158 may also include a quick-release lever 160. This lever, when engaged, temporarily disengages the threaded shaft 159 from the movable jaw 156, allowing for rapid opening of the clamp without requiring manual unthreading. This feature is particularly beneficial for users who frequently install and remove the tailgate bike pad system 10 or the securing system 400, as it significantly reduces the time and effort required for attachment and removal.

To further enhance security, certain implementations of the threaded adjustment mechanism 158 may incorporate a locking mechanism 162, such as a thread-locking nut, detent system, or an integrated key-operated lock. This prevents unauthorized removal of the securing system and ensures that the clamp assembly 150 remains securely fastened under all driving conditions.

The threaded adjustment mechanism 158 provides a reliable, customizable, and secure method of attaching the securing system 400 to the tailgate 200, allowing for fine-tuned adjustments while offering quick-release functionality for convenience. Its robust construction and anti-loosening features ensure long-term stability and durability, making it a versatile and efficient solution for securing bike pads, bicycles, or other cargo onto a pickup truck's tailgate.

Figure 16:
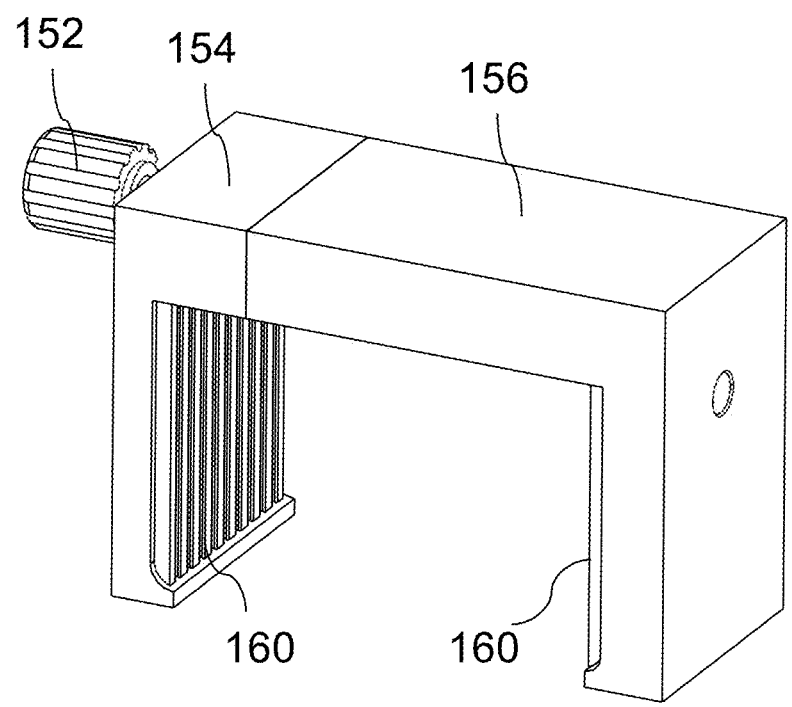
FIG. 16 is a perspective view of the clamp assembly shown in FIG. 15, further including rubber padding on the interior surface of the clamp, preventing direct contact with the tailgate to reduce the risk of scratching or damage.
Figure 17:
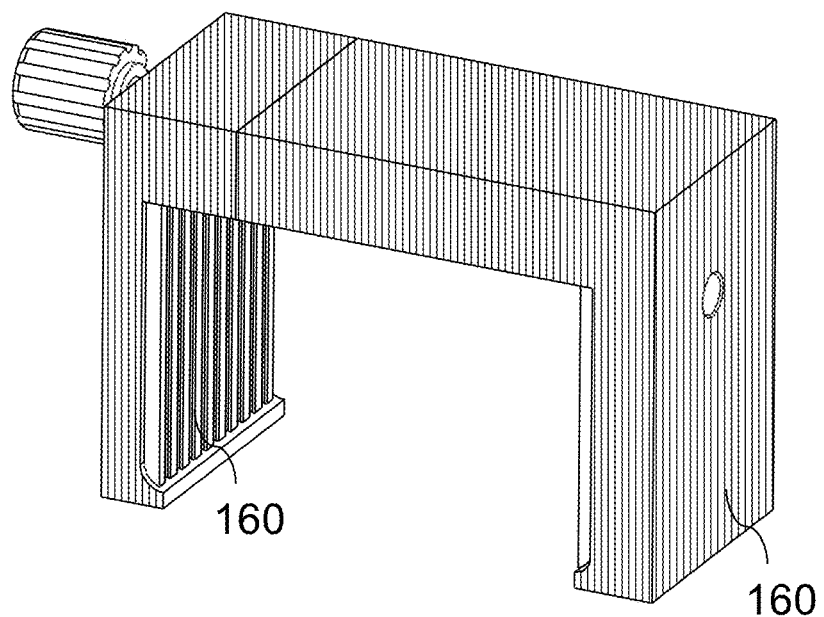
FIG. 17 is a perspective view of the clamp assembly, wherein rubber padding is applied to both the interior and exterior surfaces of the clamp, providing protection not only for the tailgate but also for bicycles resting against the pad.

As shown in FIG. 16, in some embodiments, the clamp assembly 150 further includes rubber padding 160 applied to the interior surface of the clamp assembly 150, protecting the tailgate 200 from direct contact. FIG. 17 presents another embodiment, in which rubber padding 160 is applied to both the interior 162 and exterior 164 surfaces of the clamp assembly 150, ensuring protection for both the tailgate 200 and any bicycles positioned against the pad assembly 300.

Figure 18:
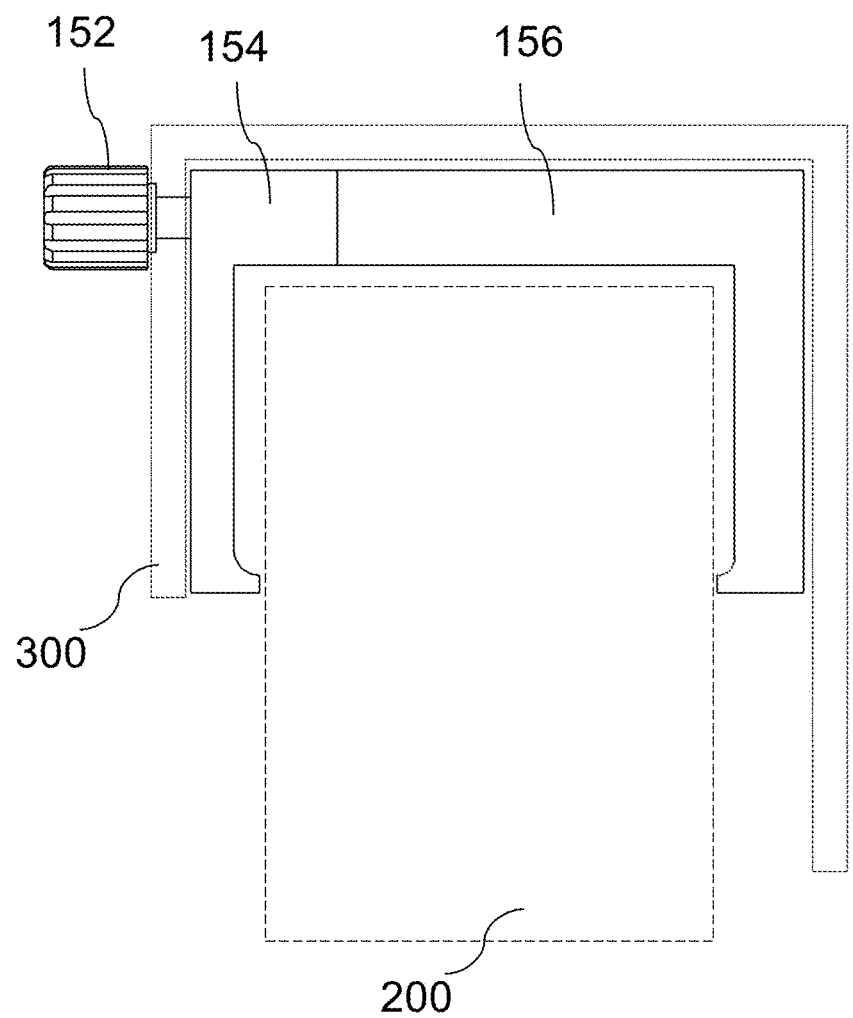
FIG. 18 is a front view of the clamp assembly engaged with the tailgate, illustrating how the fixed and movable jaws interact with the tailgate when secured in place.
Figure 19:
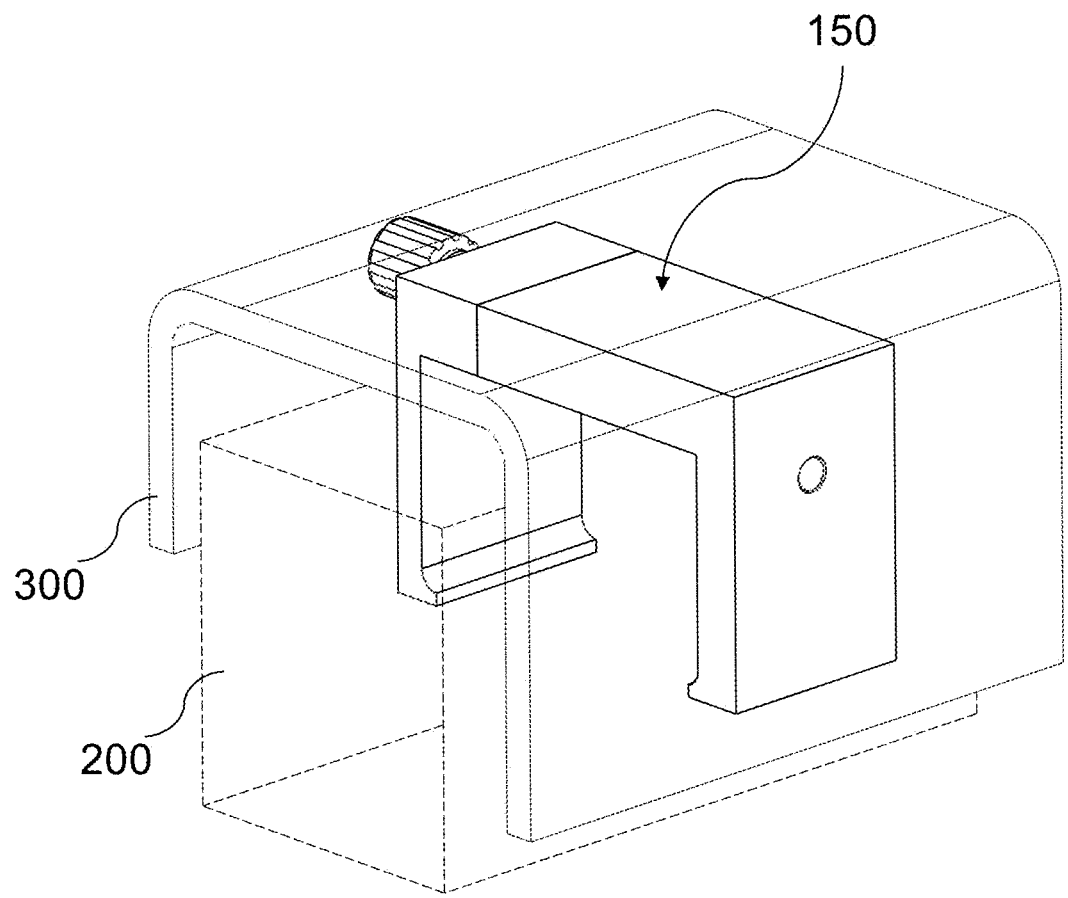
FIG. 19 is a perspective view of the clamp assembly embedded into the bike pad and secured over the tailgate, demonstrating an embodiment where the clamp is integrated into the pad assembly while still allowing for adjustable engagement.
Figure 20:
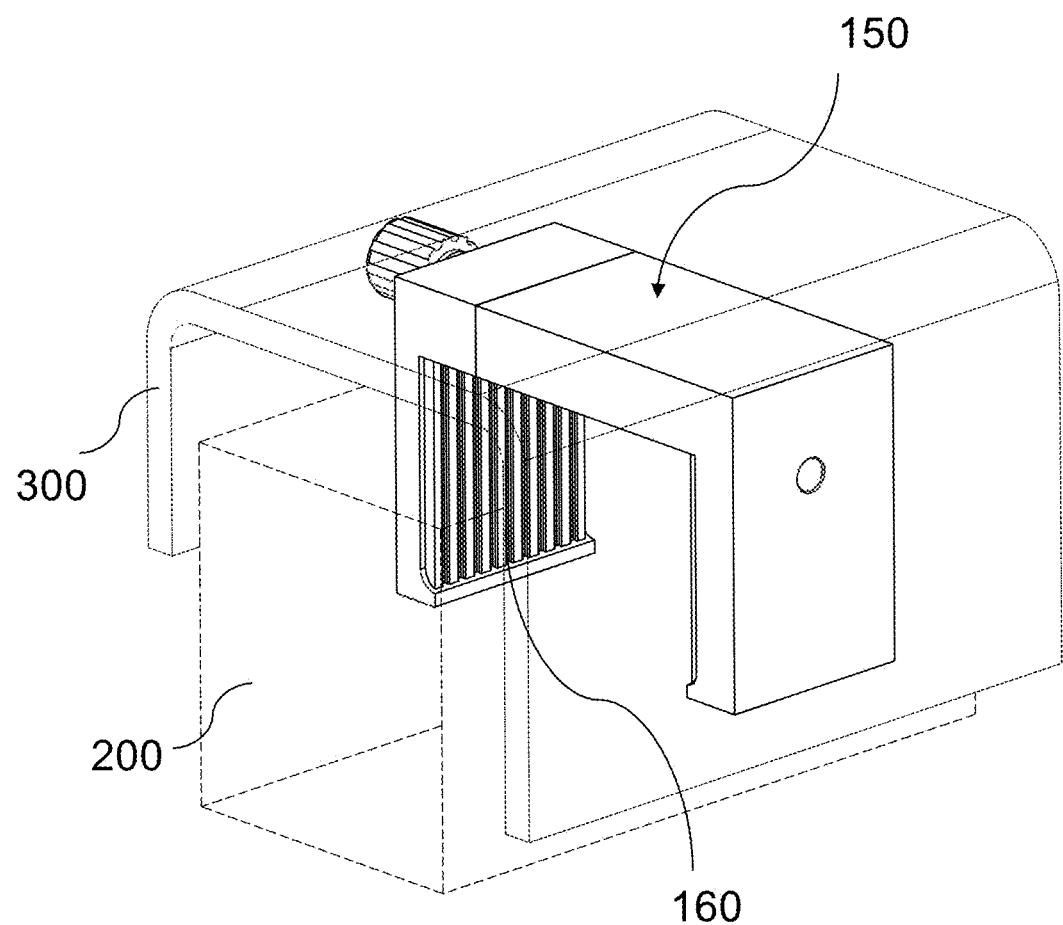
FIG. 20 is another embodiment of the present disclosure, similar to FIG. 19, but with rubber padding applied to the interior surface of the embedded clamp, ensuring protection for the tailgate while maintaining a secure attachment.

FIG. 18 illustrates a front view of the clamp assembly 150 in an engaged position with the tailgate 200, showing how the fixed jaw 154 and movable jaw 156 interact to provide a secure attachment of the pad assembly 300 to the tailgate 200. In FIG. 19, an embodiment is shown where the clamp assembly 150 is embedded within the pad assembly 300, maintaining a streamlined and integrated design while securing the pad assembly 300 to the tailgate 200. FIG. 20 presents another embodiment, similar to FIG. 19, but incorporating rubber padding 160 on the interior surface of the clamp assembly 150, providing additional protection for the tailgate 200.

Figure 21:
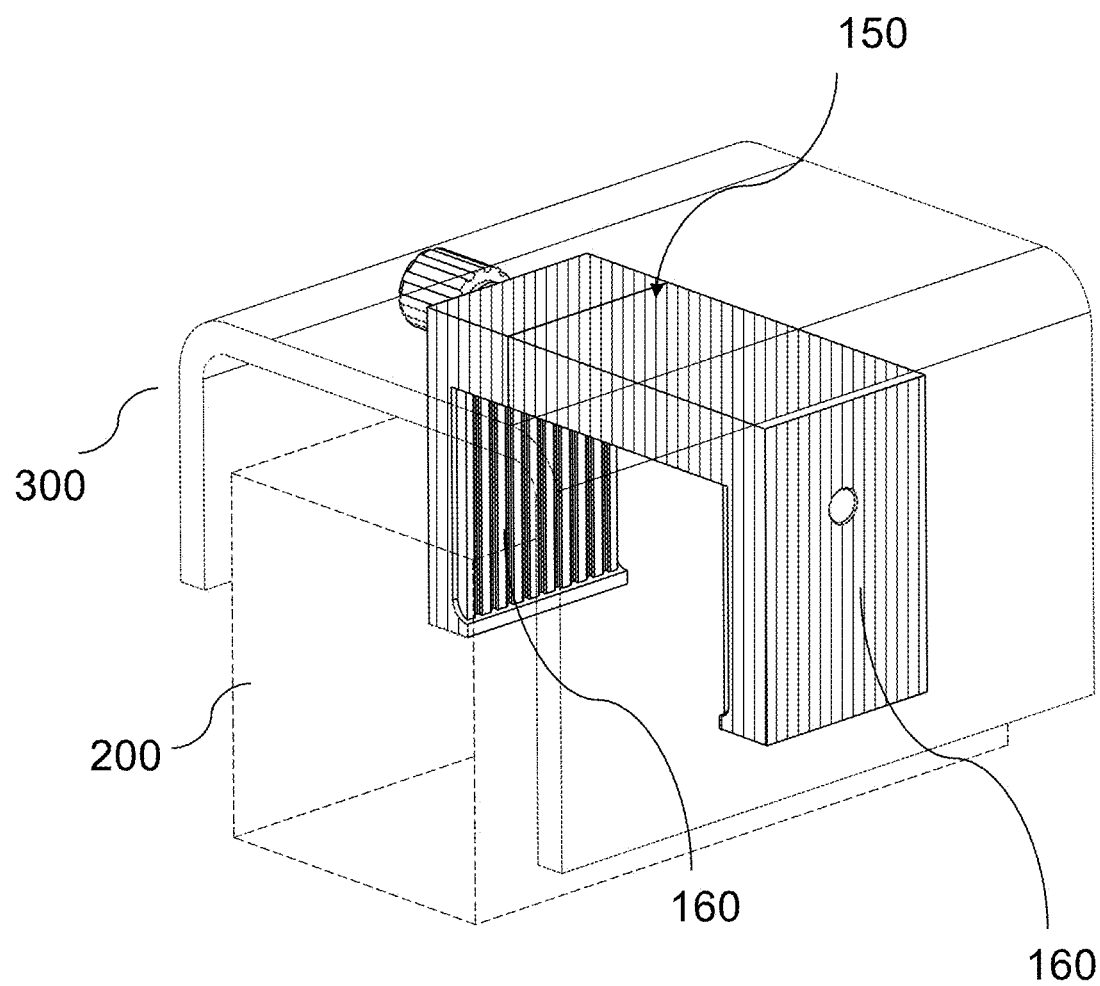
FIG. 21 is another embodiment of the present disclosure, wherein the clamp is attached to the exterior of the bike pad, with rubber padding disposed on both the interior and exterior surfaces of the clamp, protecting both the tailgate and bicycles while maintaining a secure attachment.
Figure 22:
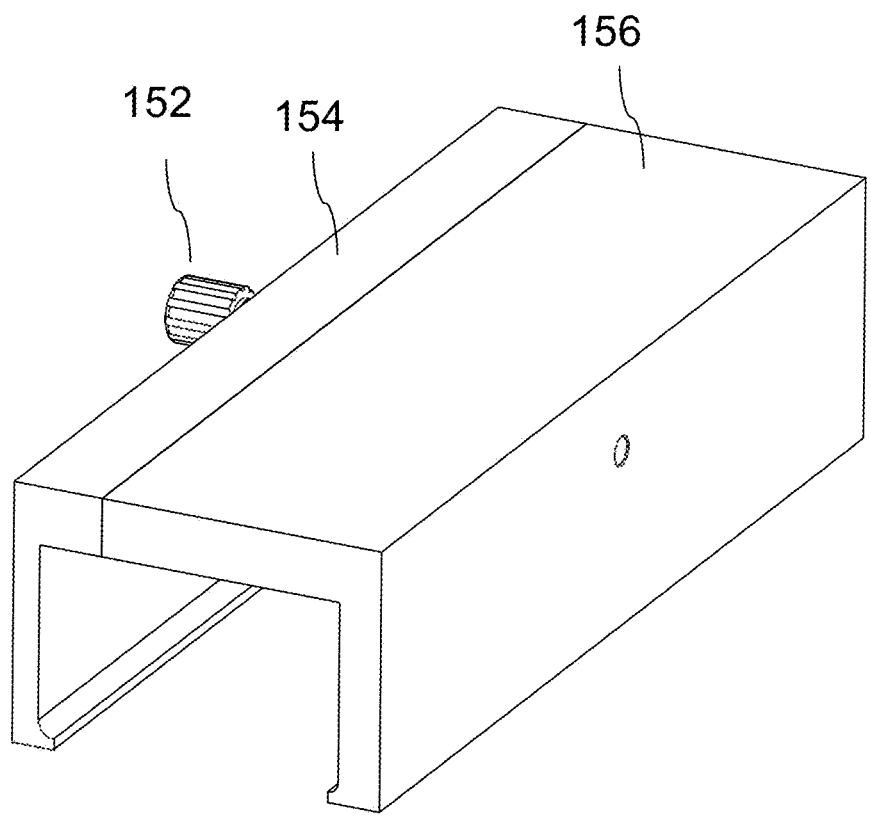
FIG. 22 is a perspective view of the clamp as a stand-alone device in accordance with the embodiments of the present disclosure.
Figure 23:
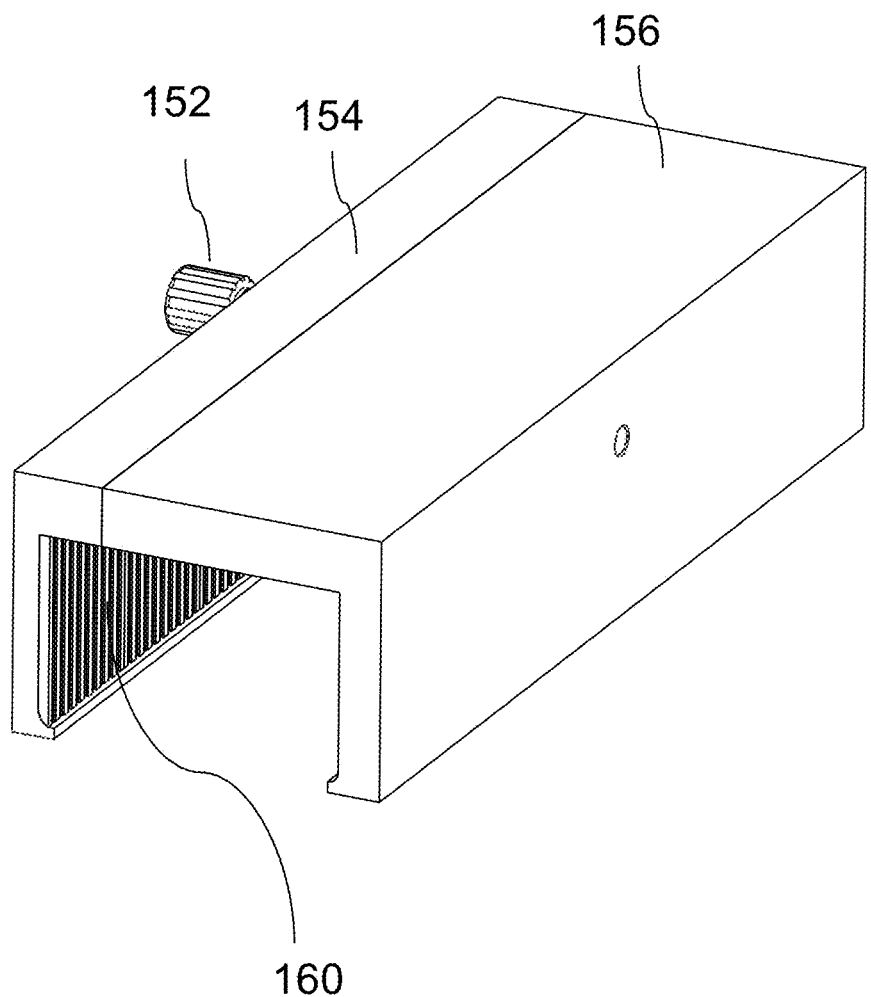
FIG. 23 is a perspective view of the clamp with a rubber padding disposed on the interior thereof.
Figure 24:
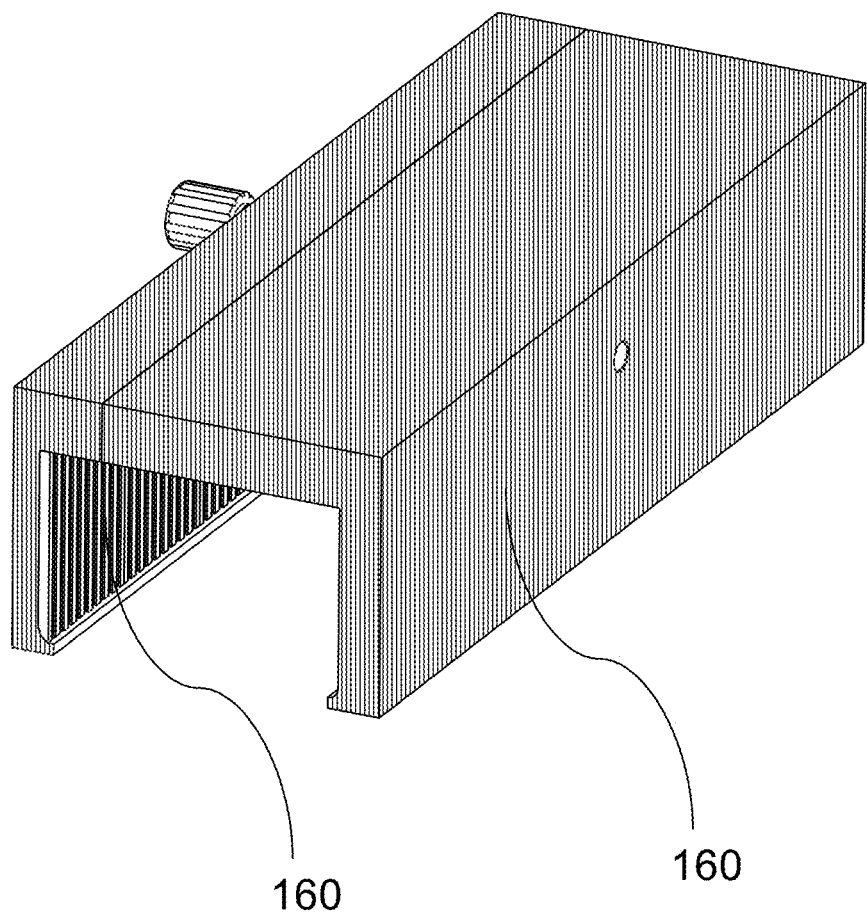
FIG. 24 is a perspective view of the clamp with a rubber padding disposed on the interior and exterior thereof.
Figure 25:
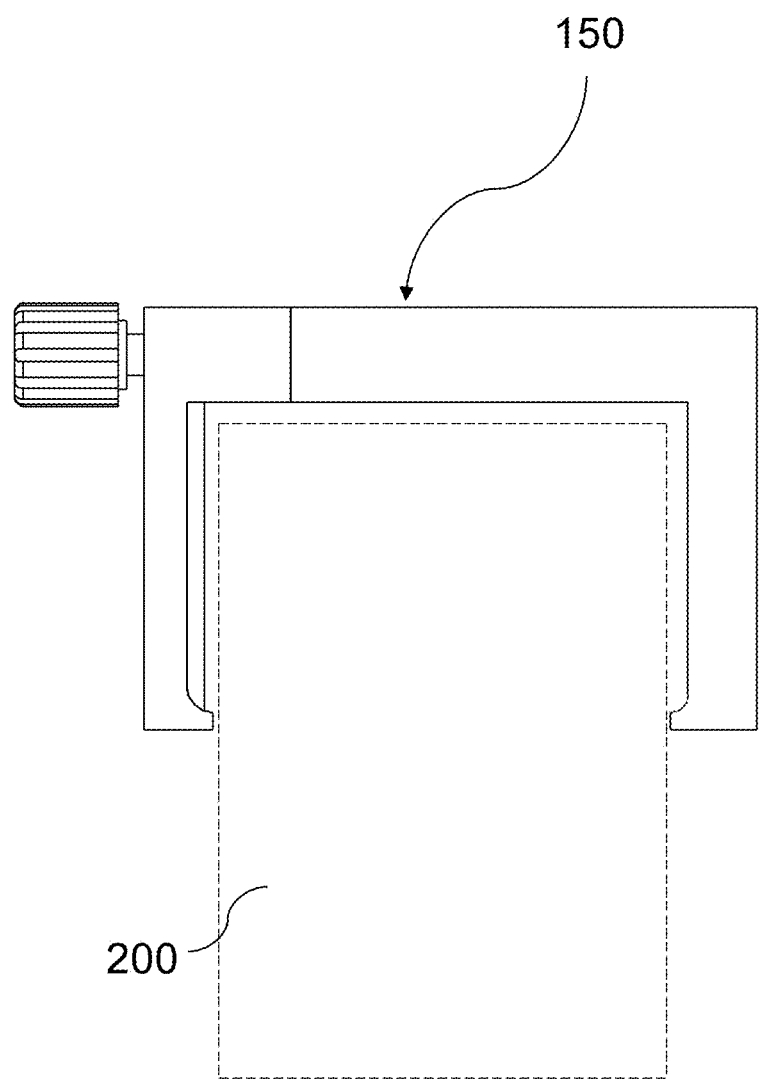
FIG. 25 is a side view of the clamp engaging a tailgate.
Figure 26:
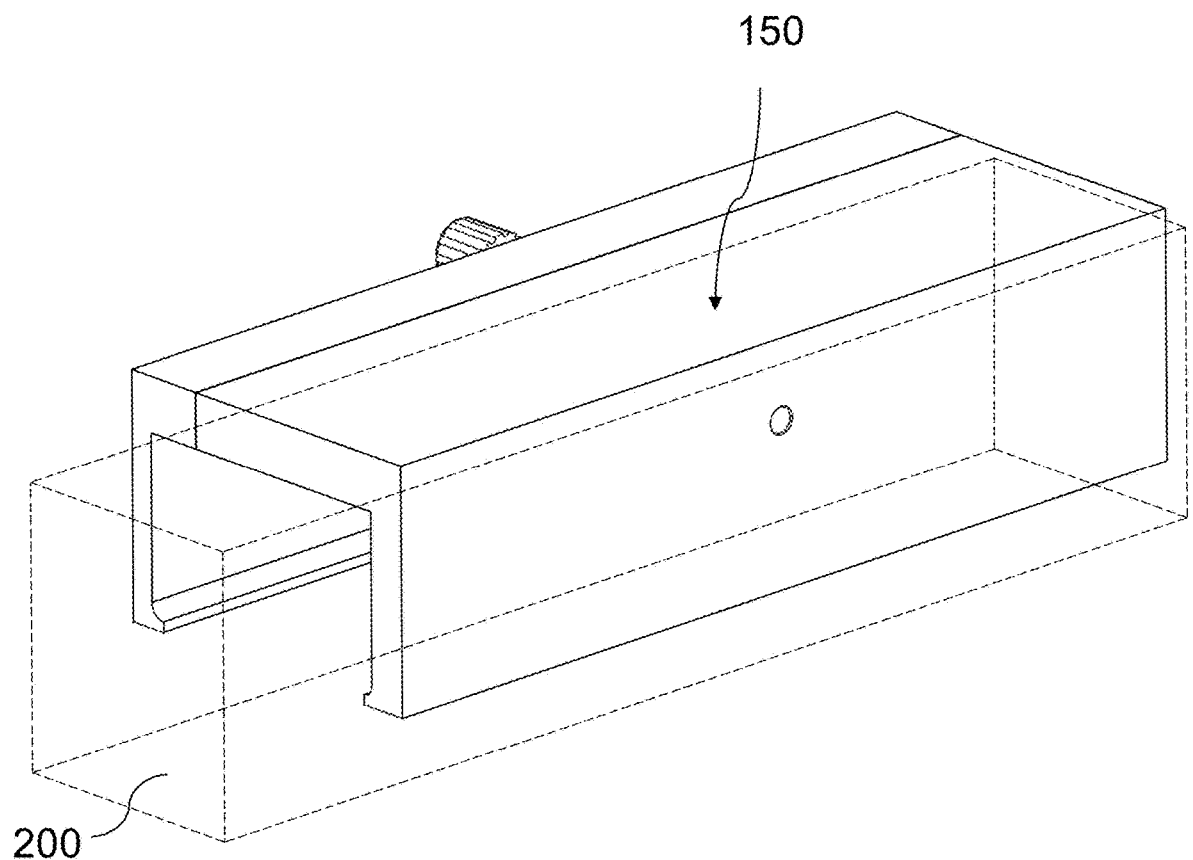
FIG. 26 is a perspective view of the clamp engaging a tailgate.
Figure 27:
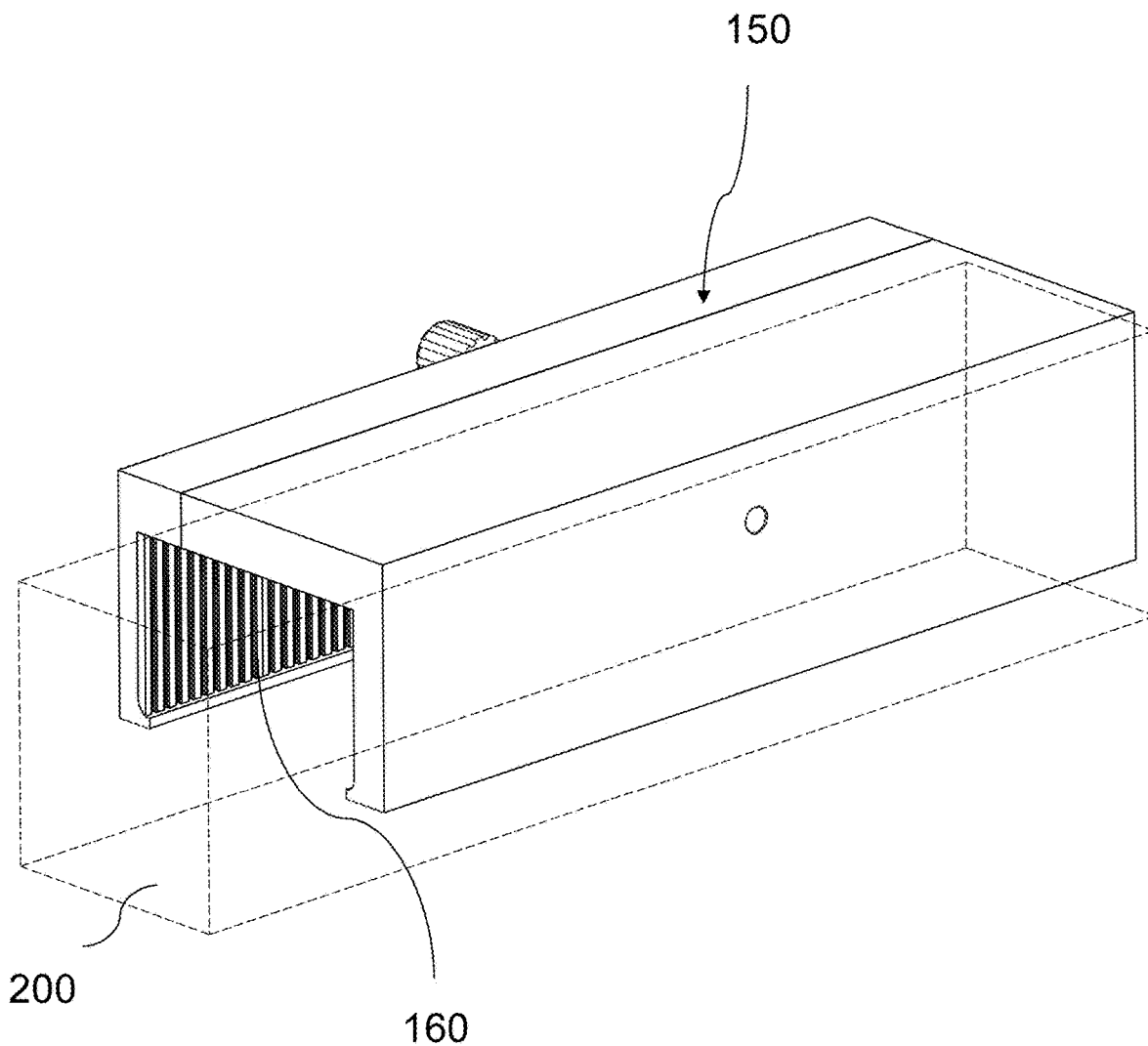
FIG. 27 is a perspective view of the clamp with a rubber padding disposed on the interior thereof.
Figure 28:
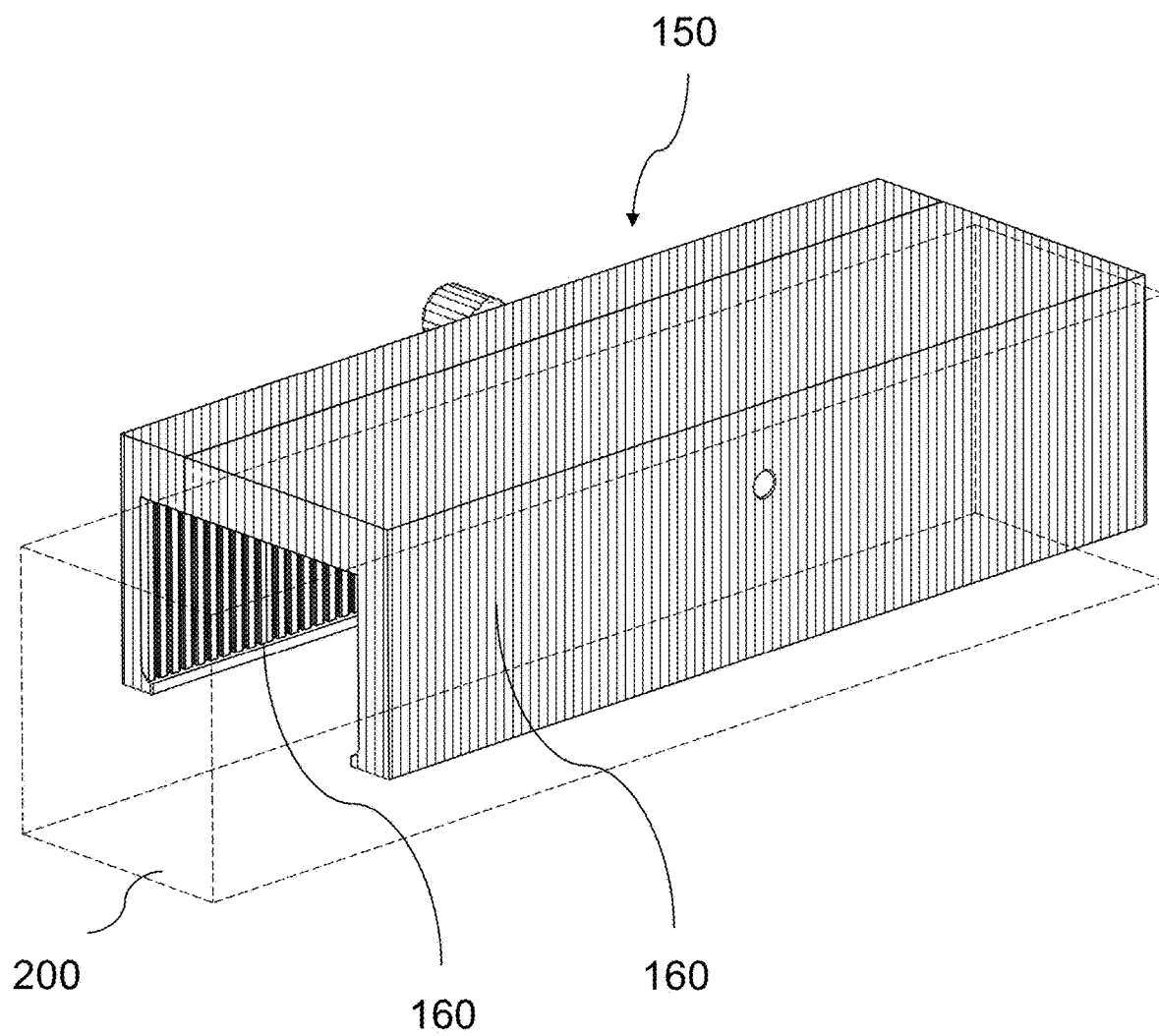
FIG. 28 is a perspective view of the clamp with a rubber padding disposed on the interior and exterior thereof.

FIG. 21 illustrates another embodiment of the present disclosure, in which the clamp assembly 150 is attached externally to the pad assembly 300, with rubber padding 160 disposed on both the interior 166 and exterior 168 surfaces of the clamp assembly 150. This configuration ensures a secure attachment to the tailgate 200 while preventing damage to both the tailgate 200 and any bicycles 500 placed against the pad assembly 300.

In all embodiments, the disclosed tailgate bike pad system 10 provides a strap-free, secure attachment mechanism that facilitates quick installation and removal, enhances user safety, and prevents damage to both the tailgate and bicycles. Various securing mechanisms, including integral clips 120, embedded or external securing clips 100, and adjustable clamp assemblies 150, allow users to customize the system based on their preference and truck design. The system ensures full tailgate functionality, allowing for unobstructed latch operation, and eliminates the need for under-tailgate straps, which are cumbersome and pose safety risks.

In another embodiment, the securing mechanism 400 may be implemented as a standalone attachment directly secured to the tailgate 200, independent of the pad assembly 300. In this configuration, the securing mechanism 400 may include one or more clips 100, integral clips 120, or clamp assemblies 150, each affixed directly to the tailgate 200 without requiring integration with a bike pad. The securing mechanism may be configured to grip the tailgate 200 using spring-loaded engagement, mechanical fasteners, or an adjustable clamping mechanism, ensuring a secure and stable hold. To prevent damage to both the tailgate 200 and any bicycles 500 supported against the securing mechanism, rubber padding 170 may be disposed on both the interior surface 172 (facing the tailgate) and the exterior surface 174 (facing outward toward the bicycle). This dual-layer padding design prevents scratches, dents, or abrasions on the tailgate 200, while simultaneously cushioning the bicycles 500 to reduce impact damage during transport. The clips 100 or clamps 150 may be adjustable to accommodate different tailgate thicknesses and ensure proper positioning for securing bicycles of various frame sizes. This embodiment provides a versatile securing solution, allowing users to install a protective attachment system directly onto their truck tailgate, even when a bike pad is not in use.

FIGS. 22-28 illustrate an embodiment of the present disclosure in which the clamp 150 is directly affixed to the tailgate 200 without requiring integration with a bike pad. In this configuration, the clamp functions similarly to a bike pad by providing a protective and secure mounting surface for bicycles. When equipped with rubber padding 160 on the interior surface, the clamp prevents scratching or damage to the tailgate 200. In some implementations, additional rubber padding may also be applied to the exterior surface of the clamp, further protecting bicycles from impact and enhancing grip during transport.

To accommodate multiple bicycles, several clamps 150 can be employed along the width of the tailgate 200, with each clamp providing individual support and stabilization for a single bicycle. This modular approach allows users to customize the number and positioning of clamps based on the number of bicycles being transported, ensuring a secure and evenly distributed mounting system.

The tailgate bike pad system 10, including the pad assembly 300, the securing mechanisms 400 (which may comprise clips 100, integral clips 120, or clamp assemblies 150), and the rubber padding 170, is constructed from durable, lightweight, and weather-resistant materials to ensure long-term reliability, strength, and resistance to environmental factors. The pad assembly 300 may be made from multi-layered synthetic fabrics, such as heavy-duty polyester, nylon, or vinyl-coated materials, which provide water resistance, UV protection, and abrasion resistance. In some embodiments, the pad assembly 300 may include foam padding 310 or reinforced polymer inserts to enhance impact absorption and protect both the tailgate 200 and any secured bicycles 500.

The securing mechanisms 400, including clips 100, integral clips 120, and clamp assemblies 150, may be formed from high-strength aluminum alloys, stainless steel, or impact-resistant composite polymers. Aluminum and stainless steel provide superior corrosion resistance, while composite polymers offer lightweight yet durable structural integrity. The clips 100 and integral clips 120 may be constructed using spring-tempered steel or reinforced plastics, ensuring a secure grip while allowing for slight flexing to accommodate different tailgate 200 profiles. The clamp assemblies 150 may utilize hardened steel or die-cast aluminum, providing robust clamping force and wear resistance while keeping the overall system lightweight.

The rubber padding 170, applied to the interior surface 172 of the securing mechanisms to prevent tailgate 200 damage and to the exterior surface 174 to cushion bicycles 500, may be composed of high-density thermoplastic elastomers (TPE), silicone rubber, or neoprene. These materials offer excellent shock absorption, flexibility, and resistance to extreme temperatures and moisture. In some embodiments, the rubber padding 170 may have textured or grooved surfaces to enhance grip and prevent slippage.

Additional protective features may include UV-resistant coatings, anodized finishes, or powder coatings on metal components, providing extended durability against sun exposure, moisture, and road debris. Stitching and bonding of fabric components in the pad assembly 300 may utilize reinforced double-stitching or heat-sealed seams, ensuring long-term structural integrity. The material selection for all embodiments is optimized for strength, durability, and protection, ensuring that the system withstands repeated use, exposure to harsh weather conditions, and the demands of transporting bicycles securely and safely.

In addition to the securing mechanisms described in the present disclosure, including clips 100, integral clips 120, and clamp assemblies 150, other securing mechanisms may be employed to achieve a stable and secure attachment of the pad assembly 300 or a standalone securing system 400 to the tailgate 200. These alternative securing mechanisms may include spring-loaded retention arms, ratcheting strap assemblies, magnetic fasteners, vacuum suction cups, and expandable friction-locking mechanisms, each offering unique benefits for installation, removal, and stability.

A spring-loaded retention arm may be integrated into the pad assembly 300 or used as a standalone securing mechanism. This mechanism would consist of a pivoting arm with a preloaded spring force, allowing the arm to automatically engage the tailgate 200 when the pad or securing system is positioned. The spring tension maintains a firm grip on the tailgate, while a manual release lever enables quick removal. This design eliminates the need for manual tightening or tool-based adjustments, making it an effective tool-free securing solution.

A ratcheting strap assembly may also be used, incorporating a retractable strap housed within a ratchet mechanism that allows for incremental tensioning around the tailgate 200. Unlike traditional straps that require under-tailgate threading, this mechanism would enable a top-down securing method, where the ratchet assembly pulls the pad or securing system tightly against the tailgate 200. A quick-release lever would allow for fast removal without requiring users to unthread the strap manually.

Another alternative securing mechanism includes magnetic fasteners, which may be embedded within the pad assembly 300 or securing mechanism. These magnets would engage with a ferromagnetic surface of the tailgate 200, providing a secure yet non-invasive attachment. High-strength neodymium magnets or electromagnetic retention systems may be used, with optional rubberized coatings to prevent direct metal-to-metal contact and potential damage to the tailgate 200.

A vacuum suction cup mechanism could also be employed, featuring high-strength suction pads that adhere to the tailgate 200 via negative pressure. This mechanism would include a manual pump or locking lever to create and maintain suction, ensuring a firm, vibration-resistant hold while allowing for quick release when needed. This securing method is advantageous for temporary installations, requiring no permanent modifications to the tailgate.

An expandable friction-locking mechanism may further enhance the versatility of the securing system. This mechanism could include adjustable expansion arms or wedge-based inserts that, when placed along the interior-facing portion 204 of the tailgate 200, expand to create a compression-based locking effect. This mechanism ensures a tight and stable hold without the need for external fasteners, while a release actuator allows for controlled disengagement.

These alternative securing mechanisms provide additional flexibility and customization for users, allowing them to select the most suitable attachment method based on their vehicle type, usage requirements, and personal preferences. Each of these securing mechanisms may be used individually or in combination with clips 100, integral clips 120, or clamp assemblies 150, further enhancing the adaptability and ease of use of the tailgate bike pad system 10 or the standalone securing system 400.

Figure 29:
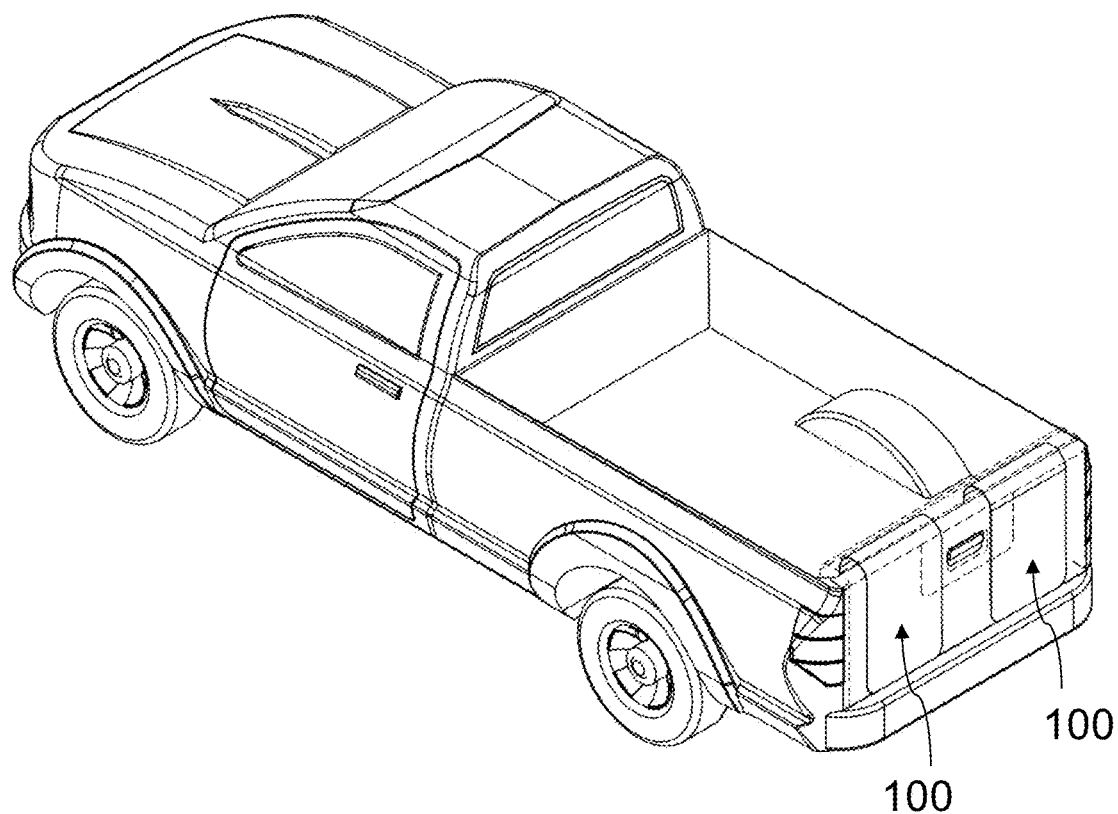
FIG. 29 is a perspective view of a pickup truck with a bike pad system installed over the tailgate, incorporating two clips positioned on opposite sides of the tailgate latch, securing the pad in place while maintaining access to the latch.
Figure 30:
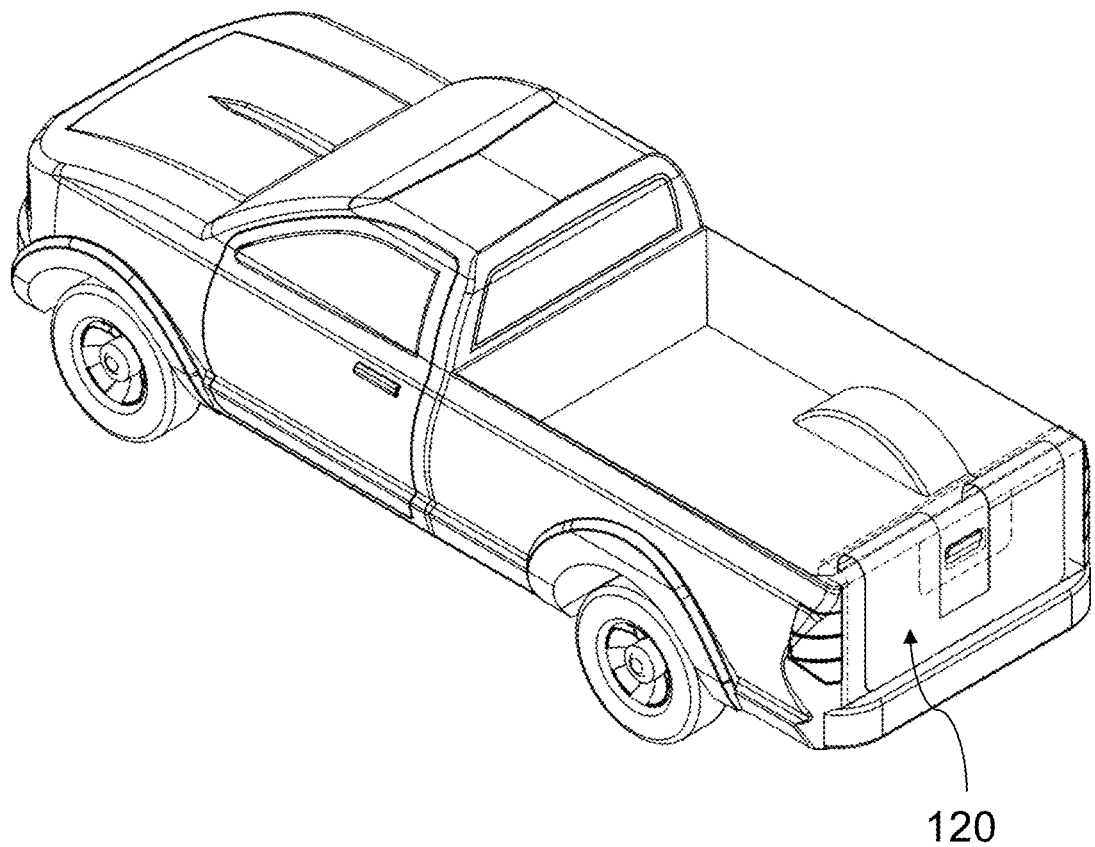
FIG. 30 is a perspective view of the same pickup truck configuration, wherein the bike pad system utilizes a single centrally positioned clip aligned with the tailgate latch opening to secure the pad assembly.
Figure 31:
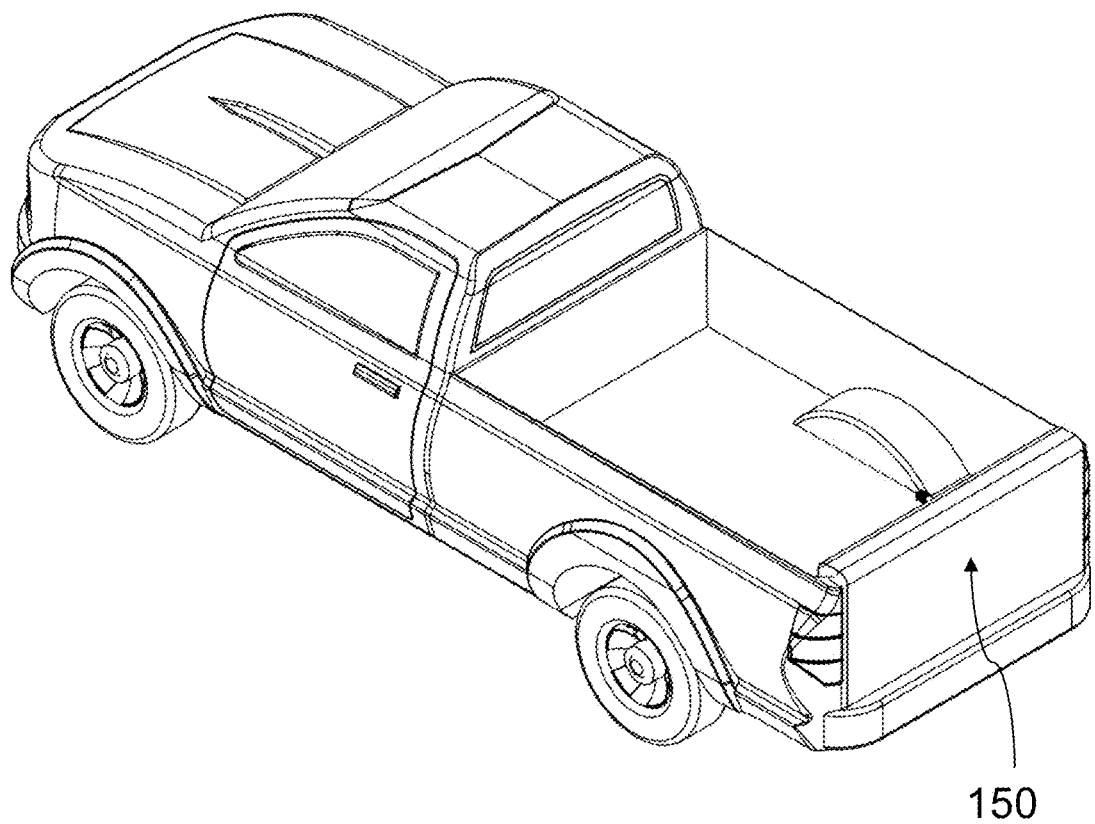
FIG. 31 is a perspective view of the same configuration as FIGS. 29 and 30, but the bike pad system incorporates a single clamp positioned at the centerline of the tailgate, replacing the clips and serving as the securing mechanism while also allowing access to the latch.

FIGS. 29-31 illustrate various embodiments of the tailgate bike pad system installed on a pickup truck, each demonstrating a different securing configuration. In FIG. 29, the pad assembly is shown secured to the tailgate using two clips 100, with one clip positioned on each side of the tailgate latch. This arrangement allows for a balanced attachment while maintaining unobstructed access to the latch. FIG. 30 depicts a similar configuration, but with the pad assembly secured by a single, centrally positioned clip 120 aligned directly above the tailgate latch opening. This embodiment simplifies the structure while still providing reliable retention and latch access. In FIG. 31, the pad assembly is secured using a single clamp 150 mounted at the center of the tailgate in place of the clip. The clamp provides a strong, adjustable hold and is similarly aligned to allow continued access to the tailgate latch. These configurations demonstrate the versatility of the system in adapting to different user preferences and tailgate geometries while preserving functionality and security.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A tailgate bike pad system, comprising:
    a pad assembly configured to be placed over a tailgate of
        a truck bed, the pad assembly including a first section configured to cover an exterior-facing portion of the tailgate and a second section configured to cover an interior-facing portion of the tailgate, the pad assembly having a bending line between the first section and the second section;

an opening formed in the pad assembly and positioned to provide access to a tailgate latch when the pad assembly is installed; and a securing mechanism positioned at the bending line of the pad assembly, the securing mechanism being operable between an open state and a tightened state, wherein:

in the open state, the securing mechanism allows the first section and the second section of the pad assembly to be spaced apart, facilitating placement over the tailgate; and in the tightened state, the securing mechanism contracts or engages to securely hold the pad assembly in place on the tailgate after installation; wherein the securing mechanism comprises at least one clip, configured to remain open when the first and second sections of the pad assembly are spaced apart and to close when the pad assembly is placed over the tailgate, thereby securing the pad in place.

2. The tailgate bike pad system of claim 1, wherein two clips are disposed on opposite sides of the opening for the tailgate latch, the clips being configured to secure the pad assembly in place while allowing access to the latch.

3. The tailgate bike pad system of claim 1, wherein the securing mechanism is embedded within an interior portion of the pad assembly.

4. The tailgate bike pad system of claim 1, wherein the securing mechanism is attached to an exterior surface of the pad assembly.

5. The tailgate bike pad system of claim 1, wherein the securing mechanism comprises at least one clip having an opening that aligns with the opening in the pad assembly, the clip being configured to secure the pad in place while permitting access to the tailgate latch.

6. The tailgate bike pad system of claim 5, further comprising a rubber padding disposed on the clip to prevent contact between the clip and a bicycle, thereby reducing the risk of scratching or damage.

7. The tailgate bike pad system of claim 1, wherein the securing mechanism comprises a clamp assembly including a rotating knob, the clamp assembly further comprising:
  a fixed jaw configured to engage one side of the tailgate;
  a movable jaw positioned opposite the fixed jaw and configured to adjust its position relative to the tailgate; and
  a threaded adjustment mechanism operably connected to the rotating knob, wherein rotation of the knob causes the movable jaw to tighten against or loosen from the tailgate, thereby securing or releasing the pad assembly in place.

8. The tailgate bike pad system of claim 7, wherein the clamp assembly is attached to an exterior surface of the pad assembly and further comprises rubber padding disposed on at least a portion of the clamp assembly to prevent contact between the clamp and a bicycle, thereby reducing the risk of scratching or damage.

9. The tailgate bike pad system of claim 7, wherein the clamp assembly is embedded within the pad assembly, with a portion of the rotating knob exposed through an opening in the pad to allow for user access and adjustment, thereby securing or releasing the pad assembly while maintaining an integrated design.

10. The tailgate bike pad system of claim 1, wherein the securing mechanism comprises a spring-loaded latch, the latch being configured to automatically engage with the tailgate when the pad assembly is placed over it and to release upon manual actuation.

11. The tailgate bike pad system of claim 1, wherein the securing mechanism comprises a magnetic retention system, the system including one or more magnets embedded within the pad assembly and configured to magnetically attach to a corresponding ferromagnetic surface on the tailgate.

12. The tailgate bike pad system of claim 1, wherein the securing mechanism comprises an elastic tension band, the band being positioned along the bending line of the pad assembly and configured to stretch during installation and contract to secure the pad assembly in place.

13. A securing system for a tailgate, comprising:
  a securing mechanism configured to attach directly to a tailgate of a truck bed, the securing mechanism including at least one of a clip that is spring-loaded and configured to snap onto the tailgate without requiring additional fasteners or a clamp assembly having a rotating knob, a fixed jaw engaging one side of the tailgate, and a movable jaw adjustable via a threaded mechanism to tighten or loosen the clamp around the tailgate;
  the securing mechanism having an interior surface configured to engage with the tailgate and an exterior surface configured to support a bicycle frame; and
  a rubber padding disposed on both the interior surface and the exterior surface of the securing mechanism, wherein the rubber padding on the interior surface prevents scratching or damage to the tailgate, and the rubber padding on the exterior surface provides cushioning for a bicycle frame when secured against the tailgate.

14. The securing system of claim 13, wherein the securing mechanism is adjustable to accommodate tailgates of varying thicknesses, ensuring a secure fit across different vehicle models.

15. The securing system of claim 13, wherein the rubber padding is made from high-density impact-resistant material, providing enhanced protection against vibrations and shocks during transport.

16. The securing system of claim 13, wherein the securing mechanism includes a quick-release mechanism, allowing for easy installation and removal from the tailgate without requiring tools.

17. The securing system of claim 13, wherein the rubber padding on the exterior surface is textured to provide enhanced grip for bicycle frames, preventing slipping or movement during transportation.

* * * * *